(12) United States Patent
Graham et al.

(10) Patent No.: US 9,046,203 B2
(45) Date of Patent: Jun. 2, 2015

(54) FLEXIBLE PIPE INCLUDING CARCASS LAYER

(75) Inventors: Geoffrey Stephen Graham, Newcastle Upon Tyne (GB); George Karabelas, Houghton le Spring (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 340 days.

(21) Appl. No.: 13/516,655

(22) PCT Filed: Dec. 20, 2010

(86) PCT No.: PCT/GB2010/052149
§ 371 (c)(1),
(2), (4) Date: Nov. 15, 2012

(87) PCT Pub. No.: WO2011/073687
PCT Pub. Date: Jun. 23, 2011

(65) Prior Publication Data
US 2013/0056105 A1   Mar. 7, 2013

(30) Foreign Application Priority Data

Dec. 18, 2009   (GB) .................................. 0922120.1

(51) Int. Cl.
*F16L 11/08* (2006.01)
*F16L 11/16* (2006.01)

(52) U.S. Cl.
CPC ............... *F16L 11/083* (2013.01); *F16L 11/16* (2013.01)

(58) Field of Classification Search
CPC ......... F16L 11/16; F16L 11/083; B23P 17/00

USPC .................. 138/120, 130, 133, 134, 174, 155
See application file for complete search history.

(56) References Cited

U.S. PATENT DOCUMENTS

| | | | |
|---|---|---|---|
| 24,222 A * | 5/1859 | McBurney | 138/139 |
| 1,001,842 A * | 8/1911 | Greenfield | 285/266 |
| 1,637,141 A | 7/1927 | Cooper | |
| 2,136,770 A * | 11/1938 | Witzenmann | 285/147.1 |
| 3,189,372 A | 6/1965 | Johnson | |

(Continued)

FOREIGN PATENT DOCUMENTS

| | | |
|---|---|---|
| DE | 34871 C | 8/1885 |
| DK | PA200901163 | 10/2009 |

(Continued)

OTHER PUBLICATIONS

International Preliminary Report on Patentability and Written Opinion of the International Searching Authority, mailed Jun. 28, 2012, for corresponding International Application No. PCT/GB2010/052149, 12 pages.

(Continued)

*Primary Examiner* — Paul R Durand
*Assistant Examiner* — Vishal Pancholi
(74) *Attorney, Agent, or Firm* — Klarquist Sparkman, LLP

(57) ABSTRACT

Flexible pipe body for transporting fluids from a sub-sea location, including a carcass layer comprising a plurality of independent hoop elements each comprising a body portion having a circular outer surface that circles around an inner circumference of a bore region of the flexible pipe, said body portion being arranged to interlock adjacent hoop elements together. A method of manufacturing flexible pipe body is also enclosed.

29 Claims, 19 Drawing Sheets

(56) References Cited

U.S. PATENT DOCUMENTS

| | | | |
|---|---|---|---|
| 3,908,703 A * | 9/1975 | Bournazel et al. | 138/120 |
| 4,074,553 A * | 2/1978 | Woodrow | 72/66 |
| 4,727,908 A * | 3/1988 | Forster | 138/120 |
| 5,197,767 A * | 3/1993 | Kimura et al. | 285/39 |
| 5,275,209 A | 1/1994 | Sugier et al. | |
| 5,778,939 A * | 7/1998 | Hok-Yin | 138/120 |
| 6,516,833 B1 | 2/2003 | Witz et al. | |
| 2004/0074553 A1* | 4/2004 | Espinasse et al. | 138/135 |
| 2004/0221907 A1 | 11/2004 | Glejbol et al. | |
| 2009/0250924 A1 | 10/2009 | Tisbo et al. | |
| 2009/0308478 A1 | 12/2009 | Vo | |

FOREIGN PATENT DOCUMENTS

| | | | |
|---|---|---|---|
| FR | 2665237 A1 | 1/1992 | |
| WO | WO02/42673 A1 | 5/2002 | |
| WO | WO2011/050810 A1 | 5/2011 | |

OTHER PUBLICATIONS

Third Party Observations filed with the European Patent Office in European Patent Application No. EP10801252.7-1758, mailed Apr. 12, 2013, 16 pages.

International Search Report and Written Opinion of the International Searching Authority, mailed May 31, 2011, for corresponding International Application No. PCT/GB2010/052149, 17 pages.

European Patent Office, "Communication—European Search Report" for European Application No. EP10801252.7-1758, Oct. 9, 2013, 6 pages.

* cited by examiner

FLEXIBLE PIPE INCLUDING CARCASS LAYER

CROSS REFERENCE TO RELATED APPLICATIONS

This is the U.S. National Stage of International Application No. PCT/GB2010/052149, filed Dec. 20, 2010, which in turn claims the benefit of United Kingdom Application No. GB0922120.1, filed Dec. 18, 2009.

The present invention relates to a method and apparatus for providing flexible pipe body having a carcass layer. In particular, but not exclusively, the present invention relates to the inclusion of a carcass layer formed as a plurality of independent hoop elements with adjacent hoop elements being disposed side-by-side in a row and being interlocked together.

Traditionally flexible pipe is utilised to transport production fluids, such as oil and/or gas and/or water, from one location to another. Flexible pipe is particularly useful in connecting a sub-sea location to a further sub-sea location or sea level location. Flexible pipe is generally formed as an assembly of flexible pipe body and one or more end fittings. The pipe body is typically formed as an assembly of layered materials that form a fluid and pressure-containing conduit. The pipe structure allows large deflections without causing bending stresses that impair the pipe's functionality over its lifetime. The pipe body is generally, but not necessarily, built up as a composite structure including unbonded metallic and polymer layers.

Such unbonded flexible pipe has been an enabler for deep water (less than 3300 feet (1005.84 meters)) and ultra-deep water (greater than 3300 feet) developments for over 15 years. Available technology enabled the industry to initially produce in deep water in the early 90s and in ultra-deep waters up to around 6500 feet (1981.2 meters) in the late 90s. Water depths greater than 6500 feet push the envelope where typical free hanging riser configurations and flexible pipe in general can operate.

In view of the external pressures experienced by flexible pipe at such water depths is well known that flexible pipe has to withstand substantial crushing forces. To this end a fluid retaining layer is often supported by an under layer referred to as a carcass. With such rough bore use the fluid retaining layer is often termed a barrier layer. In the prior art the carcass layer has been provided by helically wrapping a profiled tape along the length of the flexible pipe body. The profile tape has hook and valley regions so that as the tape is wound adjacent windings are interlocked together by nesting a hook region of a first winding into a valley region of a following adjacent winding.

There are, however, problems with such prior art techniques. Notably the generation of the profile tape is a time consuming and costly process. Typically one begins with a flat tape which is then put through a series of rollers which gradually change the profile of the tape. Subsequent to the generation of such a tape a winding step must be included during the manufacture of flexible pipe body.

Also, because of the manufacturing process associated with making the carcass tape, there are limits on the materials which can be used and shapes of profile which can be attained via this method. A limit on a second moment of inertia (a key parameter when assessing the efficacy of the carcass layer) associated with the windings is thus introduced.

If tapes are manufactured using a technique different to the rolling method then the manufacturing process for such tapes is extremely complex and costly.

A further problem associated with prior known techniques for forming a carcass layer is that a tape is continuously wound to form the carcass layer. Therefore the material forming the tape must be the same along the whole length of the carcass layer. There is therefore a compromise which must be struck between malleability of material used to generate the tape versus strength.

It is an aim of the present invention to at least partly mitigate the above-mentioned problems.

It is an aim of certain embodiments of the present invention to provide a carcass layer in flexible pipe body which is easy to manufacture.

It is an aim of certain embodiments of the present invention to provide a carcass layer in flexible pipe body which enables different materials having different strengths and other physical characteristics to be used at desired locations along the length of the carcass layer.

It is an aim of certain embodiments of the present invention to provide a carcass layer in flexible pipe body which can increase the operating envelope of a flexible pipe made using the pipe body.

It is an aim of certain embodiments of the present invention to provide a carcass layer which can aid fluid flow along a bore in the flexible pipe.

According to a first aspect of the present invention there is provided flexible pipe body for transporting fluids from a sub-sea location, comprising:

a carcass layer comprising a plurality of independent hoop elements each comprising a body portion having a circular outer surface that circles around an inner circumference of a bore region of the flexible pipe, said body portion being arranged to interlock adjacent hoop elements together.

According to a second aspect of the present invention there is provided a flexible pipe for transporting fluids from a sub-sea location, comprising:

the flexible pipe body as claimed in any preceding claim; and one or more end fitting.

According to a third aspect of the present invention there is provided a method of manufacturing flexible pipe body, comprising the steps of:

locating independent hoop elements in a side-by-side coaxial relationship; and interlocking adjacent hoop elements together thereby nesting a hook region of a first hoop element in a valley region of an adjacent element.

According to a fourth aspect of the present invention there is provided a closed hoop element for forming flexible pipe body, comprising:

a body portion comprising a hook region and a valley region on a first and further respective side of the body portion.

Certain embodiments of the present invention have the advantage that multiple hoop elements which may each have a common or different physical characteristic can be made at a remote location and then easily stored for later use during manufacturing of flexible pipe body. The separate hoop elements may be laid out in a row in a side-by-side coaxial relationship and locked together to thereby form a carcass layer.

Certain embodiments of the present invention provide a carcass layer formed from a plurality of independent hoop elements interconnected together. The hoop elements can be manufactured from different materials and can have different cross sectional area characteristics in some regions so as to considerably increase the strength of the hoop as desired.

Where strength is not an issue hoop elements made from cheaper, less strong material can be utilised.

Certain embodiments of the present invention provide the advantage that any inner cross section shape of hoop element can be utilised to form a carcass layer. Also any material, composite, polymer, metal material or the like can be used and a broad range of manufacturing processes can be used to generate the hoop elements such as bending, casting, pressing, layering or the like.

Certain embodiments of the present invention provide hoop elements which can be integrally formed or formed from two or more separate pieces. The pieces in each hoop element can themselves be manufactured from different materials as per requirement.

Embodiments of the present invention will now be described hereinafter, by way of example only, with reference to the accompanying drawings in which.

In the drawings like reference numerals refer to like parts.

Figure 1:
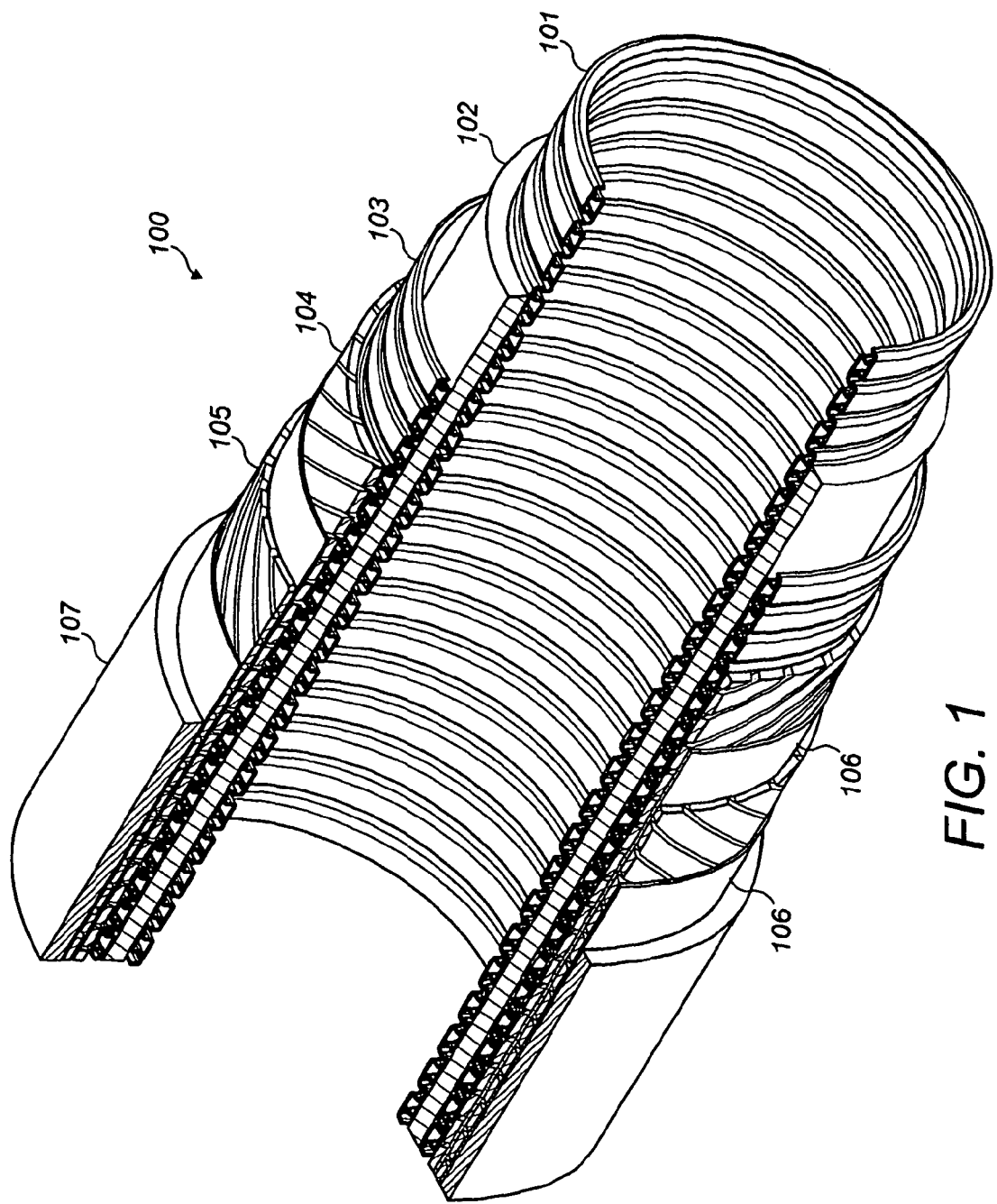
FIG. 1 illustrates a flexible pipe body.

Throughout this specification reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' as well as such 'rough bore' applications.

The internal pressure sheath 102 acts as a fluid retaining layer and comprises a polymer layer that ensures internal-fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth-bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal-pressure sheath.

The flexible pipe body also includes an optional first tensile armour layer 104 and optional second tensile armour layer 105. Each tensile armour layer is a structural layer with a lay angle typically between 20° and 55°. Each layer is used to sustain tensile loads and internal pressure. The tensile armour layers are counter-wound in pairs.

The flexible pipe body shown also includes optional layers 106 of tape which help contain underlying layers and to some extent prevent abrasion between adjacent layers.

The flexible pipe body also typically includes an optional outer sheath 107 which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
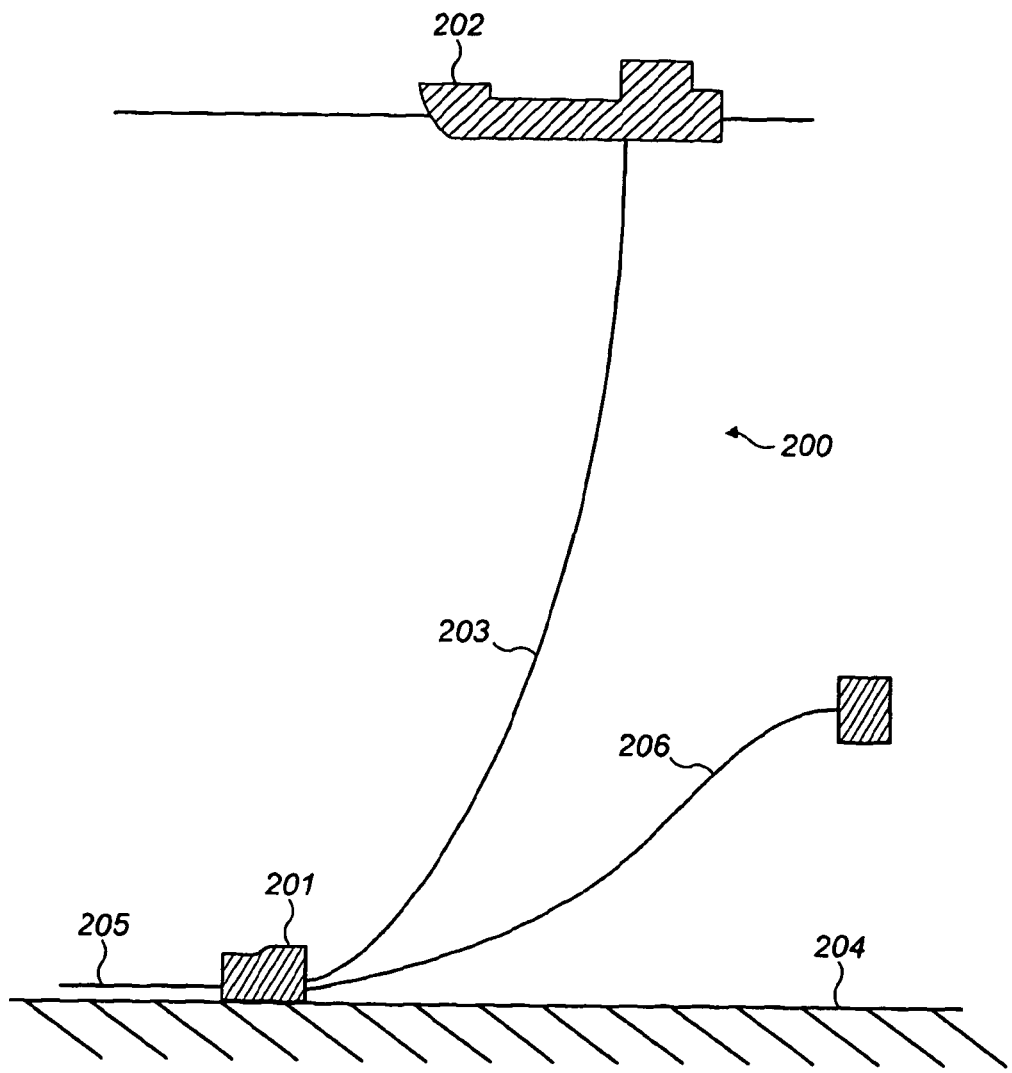
FIG. 2 illustrates a catenary riser, flow line and jumper.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe body can be utilised as a flow line 205 or jumper 206.

Figure 3:
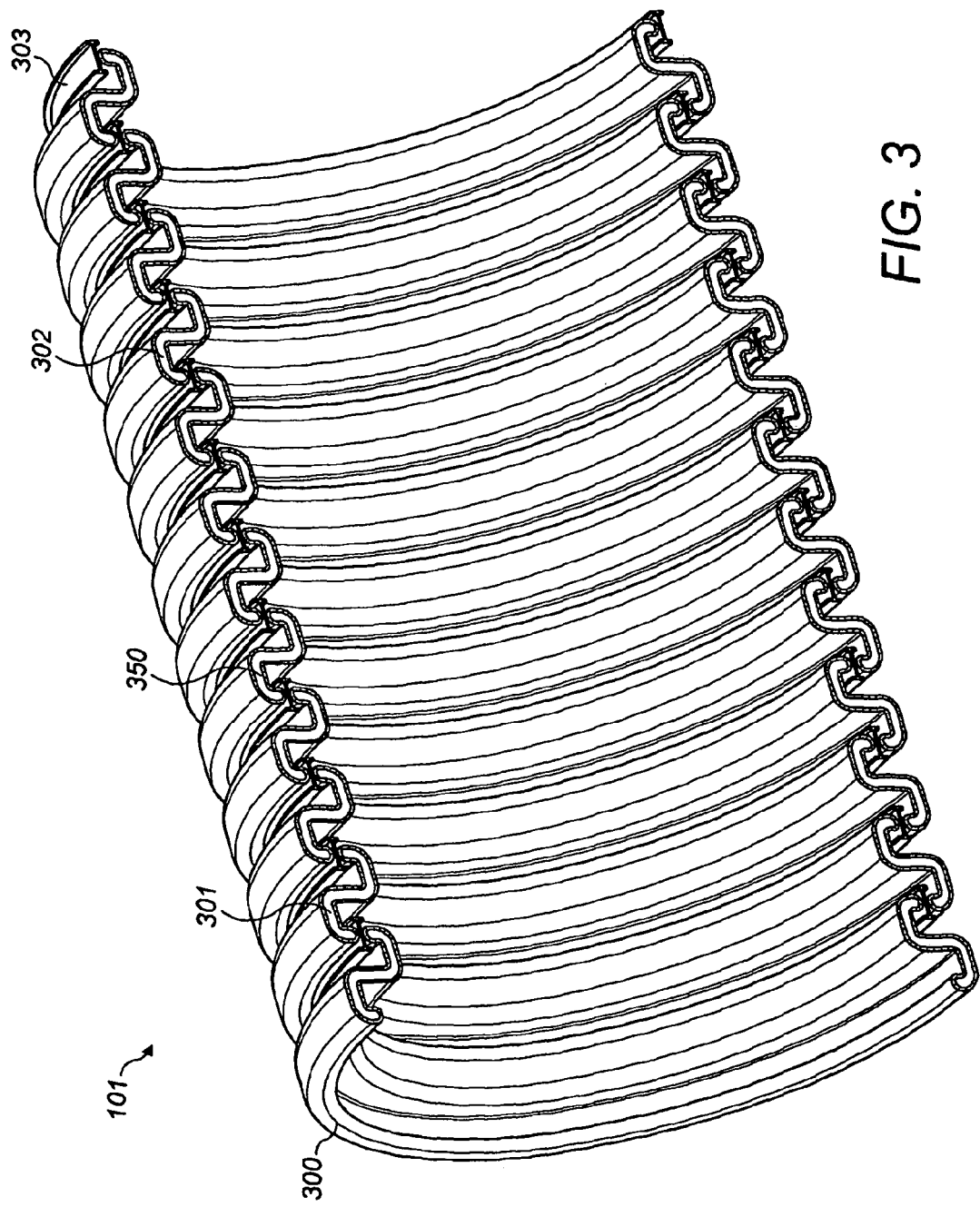
FIG. 3 illustrates a carcass layer including regions of thermal insulation material.

FIG. 3 illustrates a carcass layer 101 made by helically winding a tape 300 so that adjacent windings can interlock. The tape 300 has a substantially Z shape and the body of the tape is hollow. The body may be almost wholly hollow in which case the body acts like a shell (as shown in FIG. 3) or alternatively may be only partially hollow so that only a region of the cross section is hollow or multiple separate regions are left hollow. The body of the tape thus encapsulates at least one channel region within the tape. This channel region 301 is filled with an insulating aerogel material 350. Alternatively the channel region can be filled with another insulating material.

Throughout this description reference is made to an aerogel material. Certain aerogel materials are open-celled, mesoporous, solid foams that are composed of a network of interconnected nanostructures and which exhibit a porosity (non-solid volume) of no less than 50%. It will be understood that the term "mesoporous" refers to a material which contains pores ranging from 2 to 50 nm in diameter. It will be appreciated that aerogels can be made from a variety of substances including, but not limited to, most of the transition metal oxides (for example, iron oxide or the like), silica, biological polymers (such as pectin, agar or the like), carbon nanotubes, organic polymers (such as resorcinol-formaldehyde, polyacrylates or the like). Aerogel materials can be manufactured using many different techniques. For example silica gels are produced using the sol-gel process in which nanoparticles suspended in a liquid solution are invoked to interconnect and form a continuous, porous, nanostructured network of particles across the volume of the liquid medium.

It will be understood that the term aerogel refers to a material that has a very low coefficient of thermal conduction. That is to say of 0.05 W/mK or less. Aptly 0.02 W/mK or less.

Aerogel materials tend to be hydrophilic but can be made hydrophobic by the addition of waterproofing substances such as trimethylsilyl-$Si(CH_3)_3$. Typical thermal conductivity for aerogels is between 0.004 W/mK to 0.04 W/mK. This is in comparison to typical insulating (but non aerogel) materials used in flexible pipe technologies which have a k value of 0.15 W/mK to 0.18 W/mK.

As illustrated in FIG. 3 adjacent windings of the Z shaped tape 300 are interlocked by additionally helically winding a connecting tape 303 between adjacent windings of the carcass tape. The connecting tape winding 303 has a generally H shaped cross section.

Figure 4:
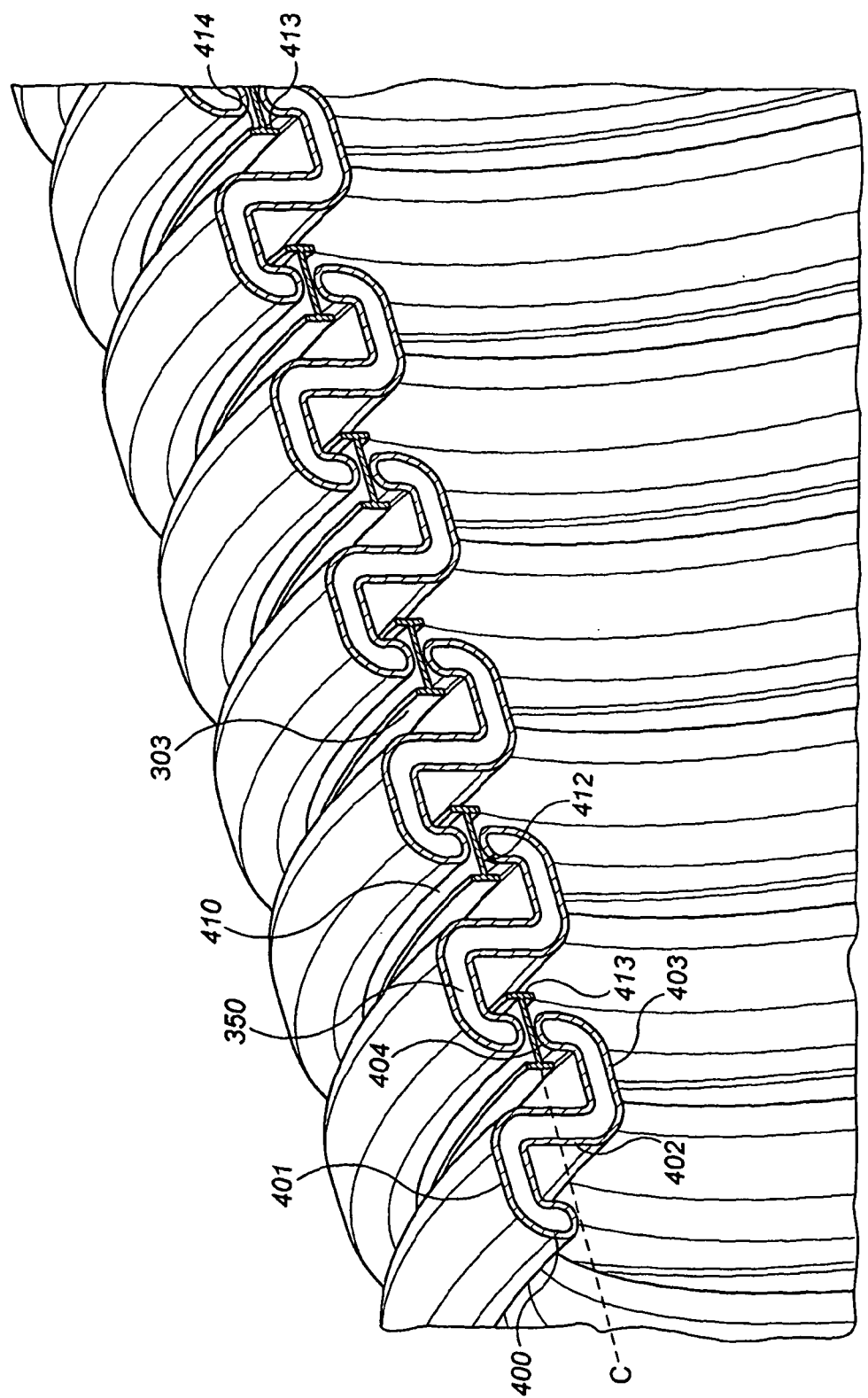
FIG. 4 illustrates windings in the carcass layer of FIG. 3.

FIG. 4 illustrates the windings of FIG. 3 in more detail. The wound tapes form a layer extending axially along the length of the flexible pipe body. The cross section of the carcass tape 300 has an imaginary centre line C and has an inwardly turned nose 400 at a first edge of the tape. The nose 400 blends into a horizontal region 401 and the tape is then bent into a substantially linear region 402 which extends firstly towards the centre line and then away from the centre line. The central region 402 of the tape then turns away from the direction of the first edge into a further horizontal region 403 before bending again in towards the imaginary centre line C terminating in a further nose 404. This further inwardly turned nose forms the other edge of the carcass tape. In terms of the windings shown in FIG. 4 the first nose is turned downwardly towards the imaginary centre line and the further nose is turned upwardly towards the imaginary centre line. It will be appreciated that whilst the noses shown in this and further examples have rounded ends, other shaped ends are useable.

As illustrated in FIG. 4, the connecting tape 303 has a substantially H-shaped cross section providing an upwardly facing substantially horizontal riding surface 410 and an opposed substantially parallel spaced apart downwardly facing substantially horizontal further riding surface 412. As illustrated in FIG. 4 an upwardly turned nose 404 of a first winding rides against the downwardly facing horizontal riding surface 412 of the connecting tape between ends which act as abutment surfaces 413 which form boundaries to the riding surface. This allows for some lateral motion between adjacent windings. A downwardly turned nose 400 of an adjacent winding is able to ride on the upward facing riding surface 410 of the H-shaped connector tape between respective abutment surfaces 414 which form side boundaries to the riding surface.

The carcass tape is preformed prior to winding to manufacture a carcass layer and a channel formed within the body of the tape is filled with aerogel material. In this way the body of the tape encapsulates aerogel material. As consecutive windings are wound and interlocked together with the connecting tape the effect is that one or more encapsulated regions of aerogel material are laid out in a layer along the axial length of the flexible pipe body.

It will be appreciated that during manufacture of the carcass tape (that is to say before the stage of manufacturing flexible pipe) the channel region within the tape can optionally first be evacuated to help reduce thermal conductivity across the tape. Also the use of rigid material (such as metal or composite materials or the like) to manufacture the body of the tape means that low density aerogels may optionally be used since the rigidity of the tape material acts as a housing to give the tape strength.

Figure 5:
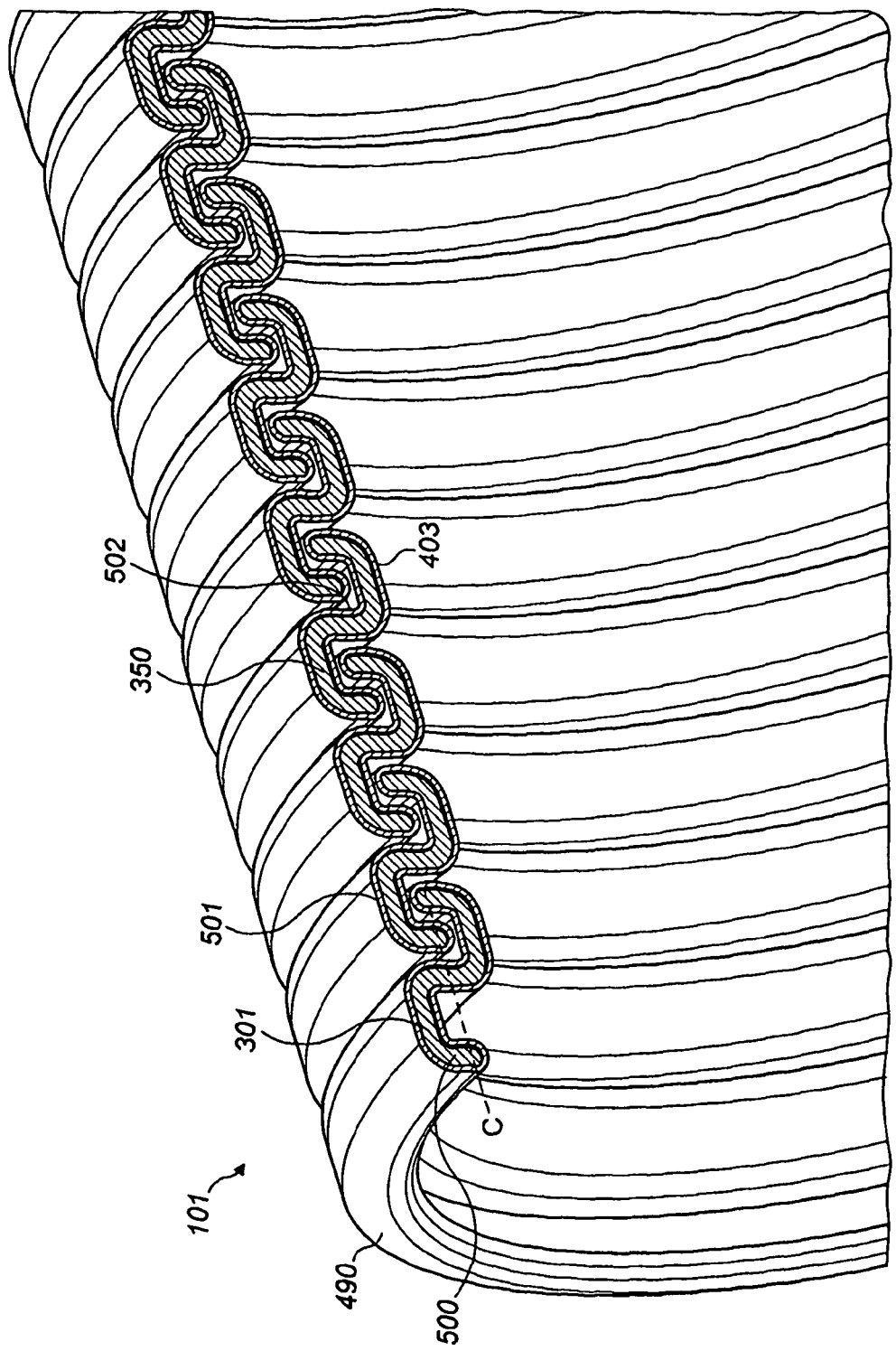
FIG. 5 illustrates an alternative carcass layer including regions of thermal insulation material.

FIG. 5 illustrates an alternative to the carcass layer illustrated in FIGS. 3 and 4 in which adjacent windings of the carcass layer tape are interlocked by nesting a hook region of one winding into a valley region of an adjacent winding. The connecting tape is thus not required.

As illustrated in FIG. 5 a carcass layer 101 is formed by helically winding a tape 490 so that adjacent windings can interlock. The cross section of the carcass tape 490 is a substantially Z-shape and the body of the tape is wholly or partially hollow. As with the previous example the body can be a shell encapsulating a single channel or can define more than one channel by having a partially filled body cavity region. The body of the tape thus encapsulates at least one channel region within the tape. This channel region 301 is filled with an insulating aerogel material or other such insulating material. The wound tape thus forms a layer extending axially along the length of the flexible pipe body. The cross section of the carcass tape 390 has an imaginary centre line C and has an inwardly turned nose 500 at a first edge of the tape. The nose 500 blends into a horizontal region 501 and the tape is then bent into a substantially linear region 502 firstly towards the centre line and then away from the centre line. The central region 502 of the tape then turns away from the first edge into a further horizontal region 503 before bending again in towards the imaginary centre line C terminating in a further nose 504. This further inwardly turned nose forms the other edge of the carcass tape. In terms of the winding shown in FIG. 5 the first nose 500 is turned downwardly towards the imaginary centre line and the further nose is turned upwardly towards the imaginary centre line.

As illustrated in FIG. 5, adjacent windings of the carcass layer tape 490 interlock together. In this sense the first nose and first horizontal region 501 and part of the central linear region 502 form a hook portion whilst a remaining portion of the central linear region 502, further horizontal portion 503 and further upwardly turned nose 504 define a valley region. A nose associated with the hooked portion of a winding nests within the valley region defined by an adjacent winding. The nose of a winding is thus able to ride within a region defined in an adjacent winding between a further nose and a central region of the winding. This prevents windings in the carcass layer from becoming separated but allows some lateral motion so that the flexible pipe body formed by the carcass layer can flex. Nesting is carried out during manufacture as the carcass tape is wound.

The carcass tape 490 is preformed prior to winding to manufacture a carcass layer and a channel formed within the body of the tape is filled with aerogel material. In this way the body of the tape encapsulates aerogel material. As windings are wound and interlocked together the effect is that one or more encapsulated regions of aerogel material are laid out in a layer of the flexible pipe body.

It will be appreciated that during manufacture of the carcass tape (that is to say before the stage of manufacturing of flexible pipe) the channel region within the tape can optionally first be evacuated to help reduce thermal conductivity across the tape. Also the use of rigid material (such as metal or composite materials or the like) to manufacture the body of the tape means that low density aerogels may optionally be used.

Figure 6:
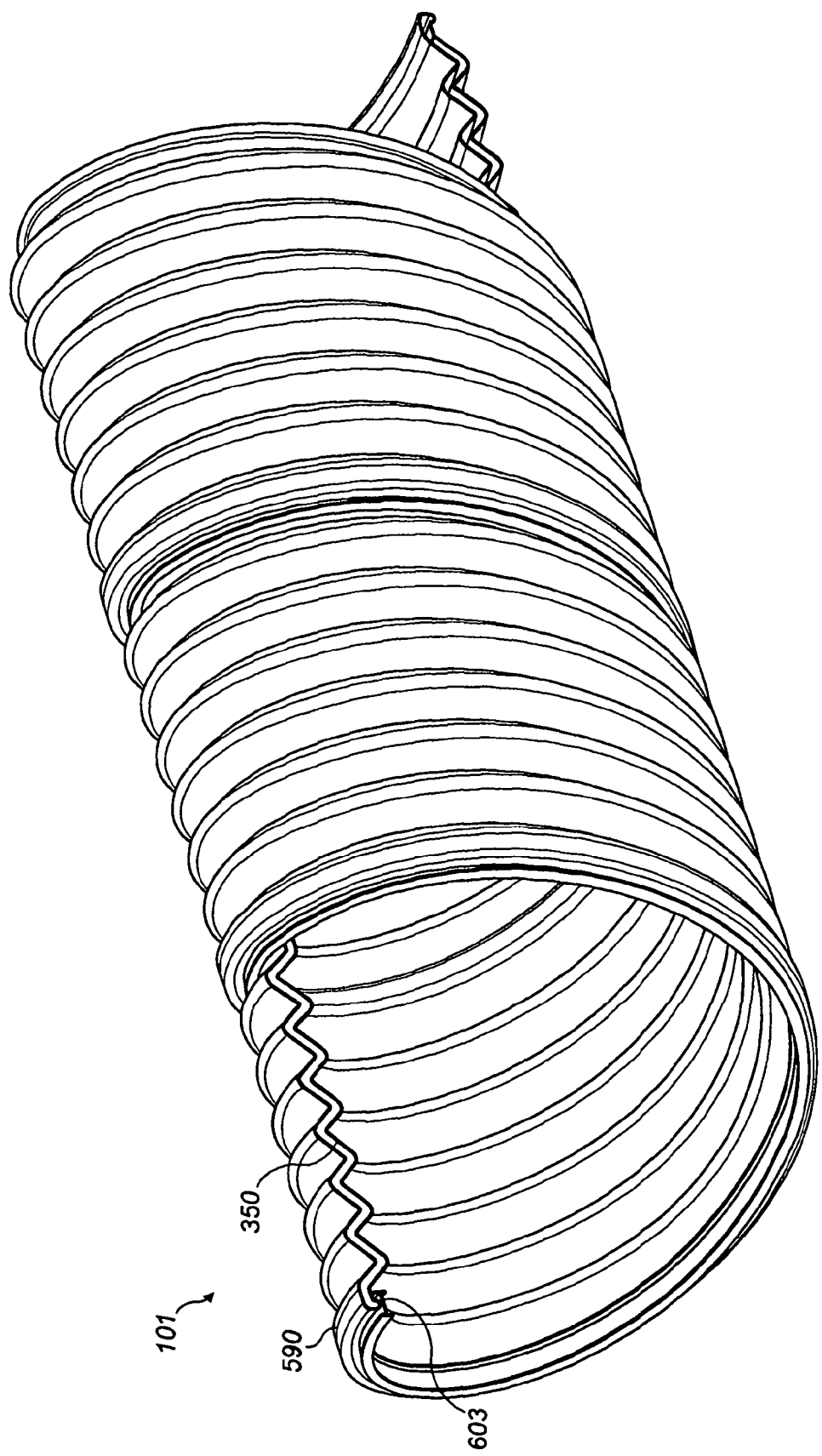
FIG. 6 illustrates a carcass layer including regions of thermal insulation material.

FIG. 6 illustrates an alternative to the carcass layer illustrated in FIGS. 3 to 5. As illustrated in FIG. 6 adjacent windings of a carcass layer tape having a corrugated cross section can be helically wound to create the carcass layer. Adjacent windings are interlocked using a connecting tape at the interface between adjacent windings.

As illustrated in FIG. 6 a carcass layer 101 is formed by helically winding a tape 590 so that adjacent windings are interlocked in some fashion. The cross section of the carcass tape 590 is corrugated including peaks and troughs and the body of the tape is wholly or partially hollow. The body of the tape thus encapsulates a channel region which itself has a corrugated shape within the tape. This channel region 301 is filled with a sheet, having an undulating cross section, of insulating aerogel material. The wound tape thus forms a layer extending axially along the length of the flexible pipe body.

Figure 7:
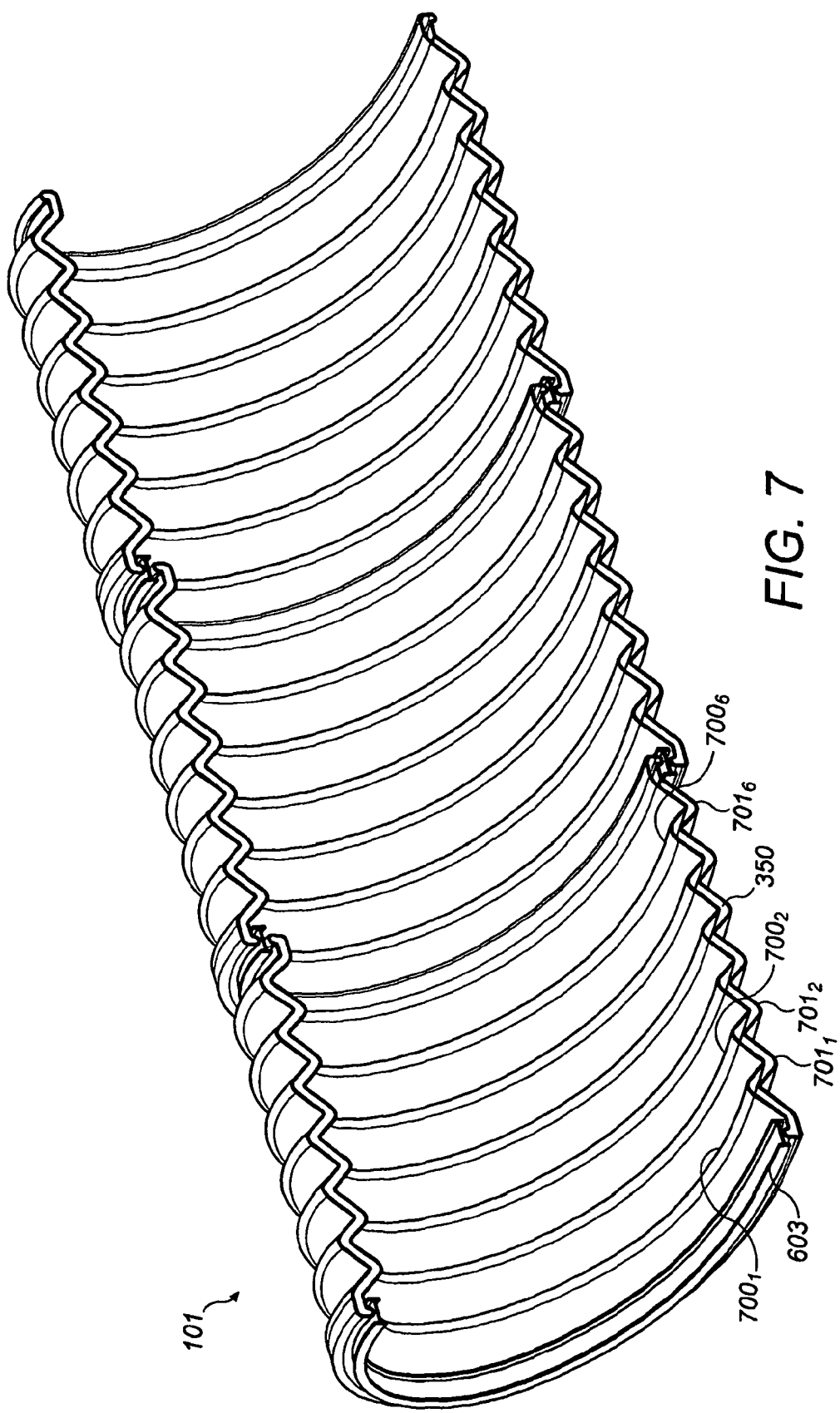
FIG. 7 illustrates windings in the carcass layer of FIG. 6.

FIG. 7 illustrates the helically wound carcass tape 590 shown in FIG. 6 in a cut away format indicating how the carcass layer 101 is formed by winding a carcass tape 590 helically. The carcass layer tape has a corrugated profile with six complete troughs $700_1$ to $700_6$. The troughs are the portions of the corrugations which extend radially innermost within the bore defined by the wound tape. The corrugated tape also includes six complete peaks $701_1$ to $701_6$ which define the radially outermost parts of the carcass layer. Tape having different numbers of peaks and troughs and different pitches to those peaks and troughs shown can of course be used. As windings are wound a connecting tape which has a substantially H-shaped cross section is also helically wound simultaneously at the interface between adjacent windings of the carcass layer tape 494. The cross sectional H-shape of the connecting tape 603 is illustrated in FIG. 7. Other connecting tapes having different cross sectional shapes but which permit interlocking can of course be used.

Figure 8:
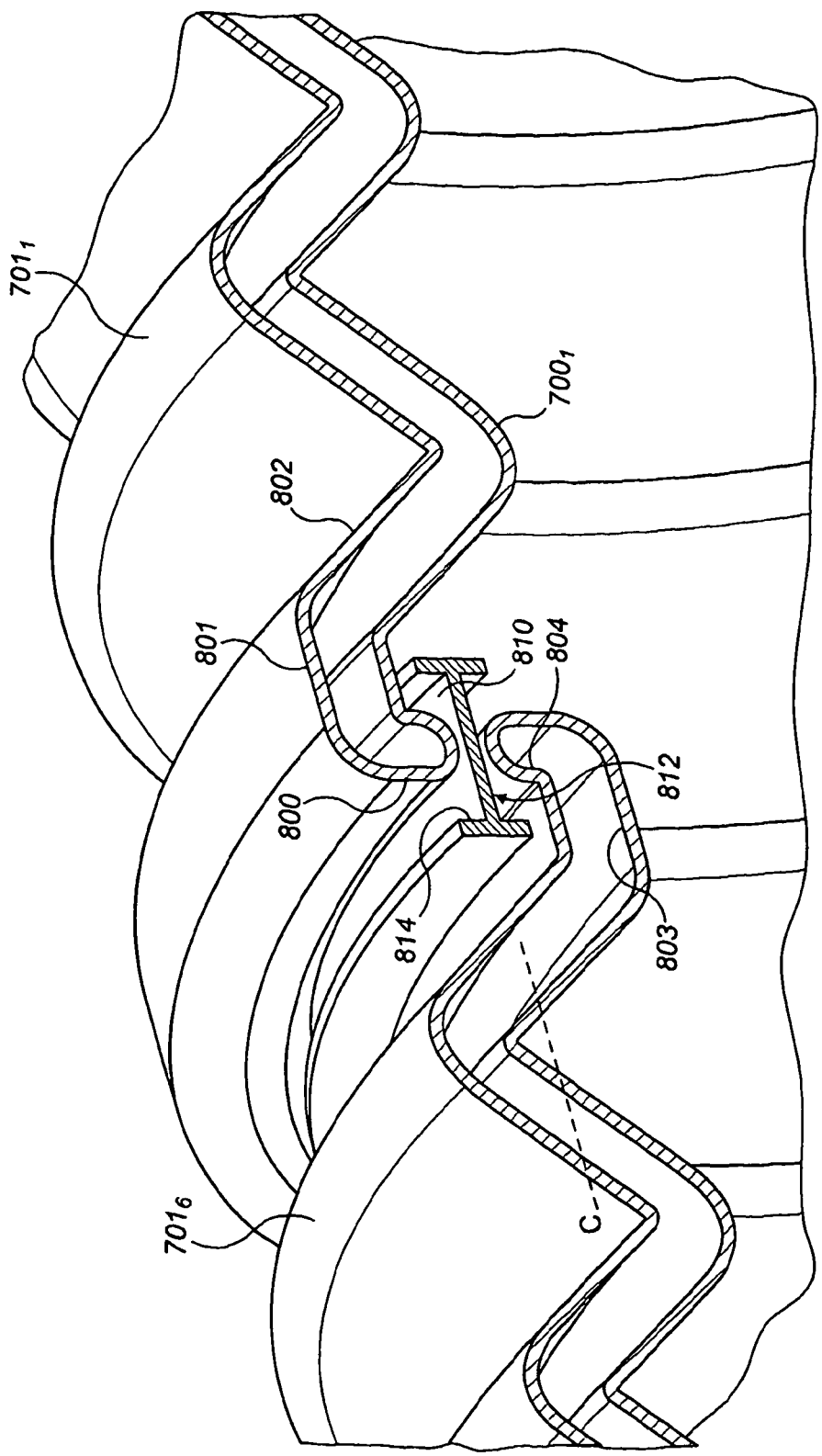
FIG. 8 illustrates interlocking of carcass layer windings.

FIG. 8 illustrates a cross section through a region where adjacent windings of the carcass layer tape 590 are interlocked together. The cross section of the carcass tape 590 has an imaginary centre line C and has an inwardly turned nose 800 at a first edge of the tape. The nose 800 blends into a horizontal region 801 and the tape is then bent at an inclined angle towards the centre line. A linear region 802 extends through the centre line towards a first trough region which defines a radially innermost fold or corrugation for the carcass tape. At this trough the tape is bent before extending radially outwardly in a further linear region towards a first peak region $701_1$. Further peaks and troughs are laid out across the cross section of the corrugated carcass tape 690. The tape extends from the final peak $701_6$ into a further horizontal region 803 before bending again in towards the imaginary centre line C terminating in a further nose 804. This further inwardly turned nose forms the other edge of the carcass tape. In terms of the windings shown in FIGS. 6, 7 and 8 the first nose 800 is turned downwardly towards the imaginary centre line and the further nose 804 is turned upwardly towards the imaginary centre line.

As illustrated in FIG. 8 the connecting tape 603 has a substantially H-shaped cross section providing an upwardly facing substantially horizontal riding surface 810 and an opposed substantially parallel spaced apart downwardly facing substantially horizontal further riding surface 812. As illustrated in FIG. 8 an upwardly turned nose 804 of a first winding rides against the downwardly facing horizontal riding surface 812 of the connecting tape between abutment surfaces 813 which form boundaries to the riding surface. This allows for some lateral motion between adjacent windings. A downwardly turned nose 800 of an adjacent winding is able to ride on the upward facing riding surface 810 of the H-shaped connector tape between respective abutment surfaces 814 which form side boundaries to the riding surface.

The carcass tape 590 is preformed prior to winding to manufacture a carcass layer and a channel formed within the body of the tape is filled with aerogel material. In this way the body of the tape encapsulates aerogel material. One, two or more channels may be formed containing aerogel. As windings are wound and interlocked together with the connecting tape the effect is that one or more encapsulated regions in the form of corrugated sheets of aerogel material are laid out in a layer of the flexible pipe body.

It will be appreciated that during manufacture of the carcass tape (that is to say before the stage of manufacturing flexible pipe) the channel region within the tape can optionally first be evacuated to help reduced thermal conductivity across the tape. Also the use of rigid materials (such as metal or composite materials or the like) to manufacture the body of the tape means that low density aerogels may optionally be used.

It will be appreciated that the corrugated carcass tape could be modified at the nose regions so that adjacent windings of the corrugated tape interlock in a manner similar to the windings shown in FIG. 5 and without the intervening connecting tape being needed.

In addition to providing encapsulated regions of aerogel material in a carcass layer of flexible pipe, tape including aerogel material may additionally or optionally be wound at other locations so as to provide one or more layers of thermal insulation as required. For example, a layer of insulating material may be formed immediately inside an outer sheath 107 of the flexible pipe body. Such an insulating layer will tend to maintain a warm or cool temperature throughout the multiple layers of the flexible pipe body as determined by the temperature of the fluid transported along the bore of the flexible pipe body. Alternatively, or in addition, an insulating layer may be formed radially immediately outside or inside of the tensile armour layers so as to maintain the metallic parts of those tensile armour layers within a predetermined temperature range. Insulating layers may be formed at any other desired location throughout the cross section of the flexible pipe body.

Figure 9:
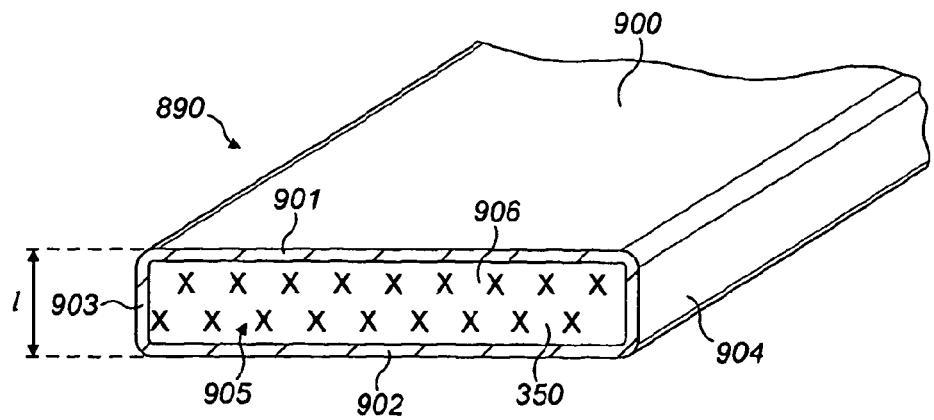
FIG. 9 illustrates an insulating tape.

FIG. 9 illustrates a tape 890 in cross section which may be wound helically around an underlying layer during manufacture of flexible pipe body. As indicated in FIG. 9 the tape 890 has an outer surface 900 which forms the body to the tape. The body 900 includes a substantially planar top surface spaced apart from and substantially parallel to an underlying bottom surface 902. Side walls connect the top surface 901 and bottom surface 902. The first side wall 903 of the body 900 and further side wall 904 of the body 900 together with the top and bottom surface thus form a shell like body. The central region 905 defined by the inner surface of the top and bottom surfaces and side walls defines a channel 906. This channel is filled with aerogel material 350.

Figure 10:
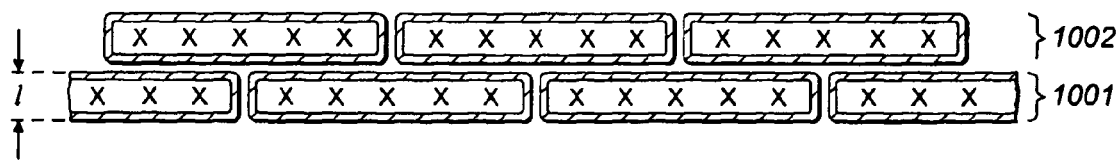
FIG. 10 illustrates how the insulating tape shown in FIG. 9 can be wound.

The tape shown in FIG. 9 can be wrapped helically in a number of ways to create a layer in the flexible pipe body. For example as shown in FIG. 10 the flexible tape is helically wound in a first layer 1001 with adjacent windings being located side by side. A further layer of tape 890 is wound over this first layer 1001 to form an overlying layer 1002. As illustrated in FIG. 10 this overlying layer can lie over the interconnection of adjacent windings in the layer below. Alternatively the overlying layer can be wound directly on top of an underlying layer. As a result an insulating layer made from multiple sub layers is generated.

Figure 11:
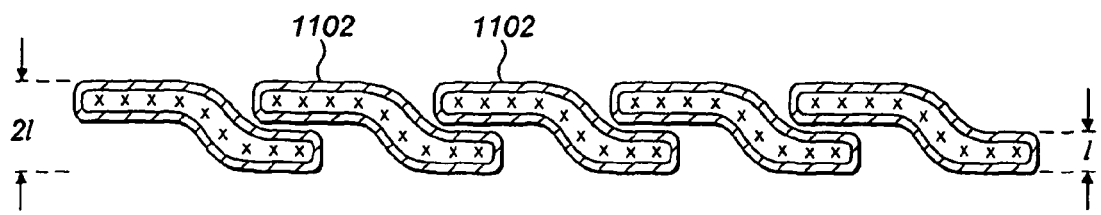
FIG. 11 illustrates how the insulating tape shown in FIG. 9 can be wound.

FIG. 11 illustrates an alternative way in which the insulating tape 890 shown in FIG. 9 can be wound over an underlying layer. As illustrated in FIG. 11 subsequent to a preceding winding being duly wound a subsequent winding 1101 is wound so that a portion of the subsequent winding 1101 lies over an underlying portion of a preceding winding 1102. The net effect of the two methods illustrated in FIGS. 10 and 11 is that an insulating layer having a thickness twice that of the thickness I of the insulating tape 890 is generated. It will be appreciated that if only one winding is utilised using the technique shown in FIG. 10 that an insulating layer having a thickness I is generated.

Figure 12:
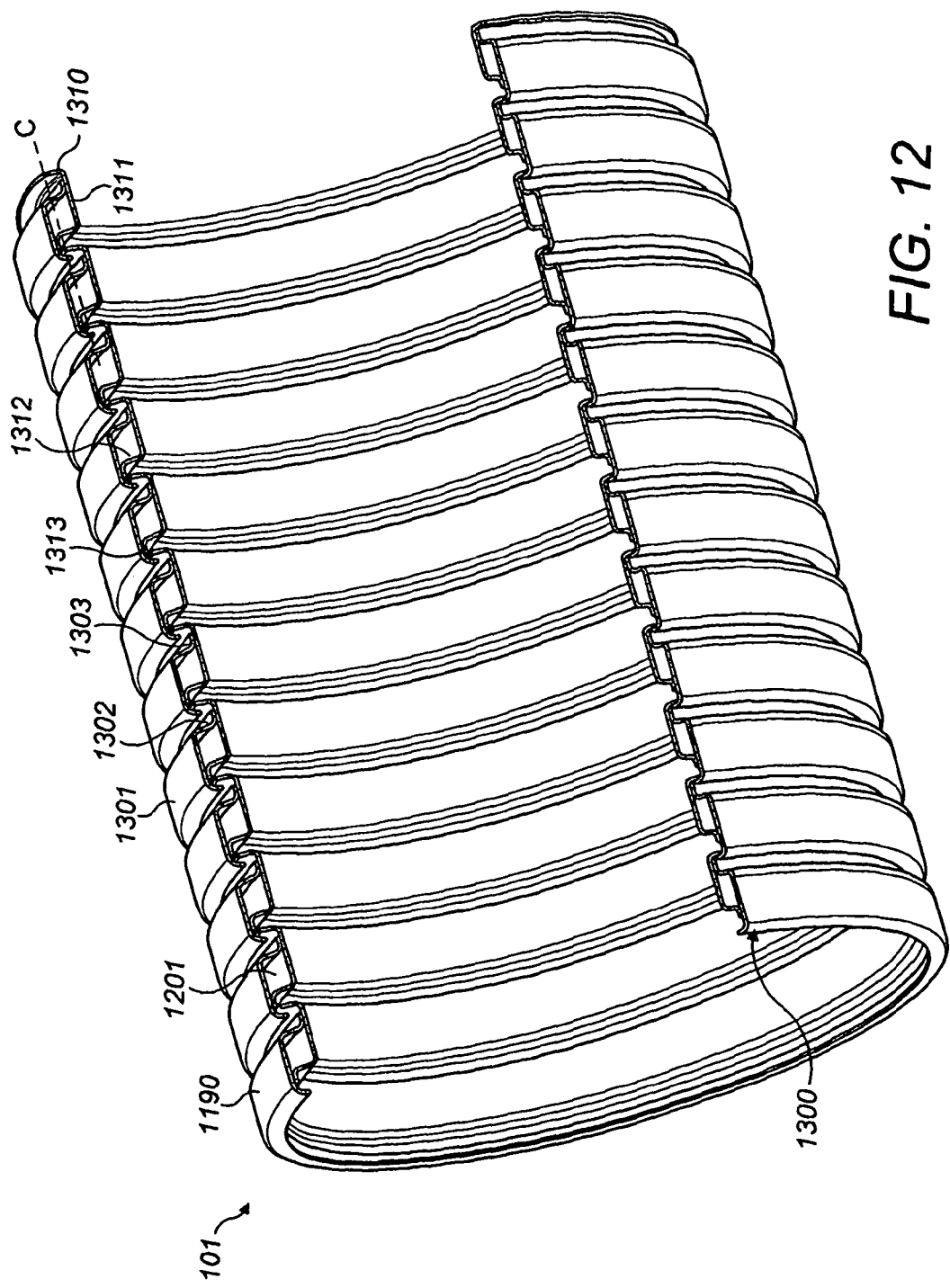
FIG. 12 illustrates a carcass layer.
Figure 13:
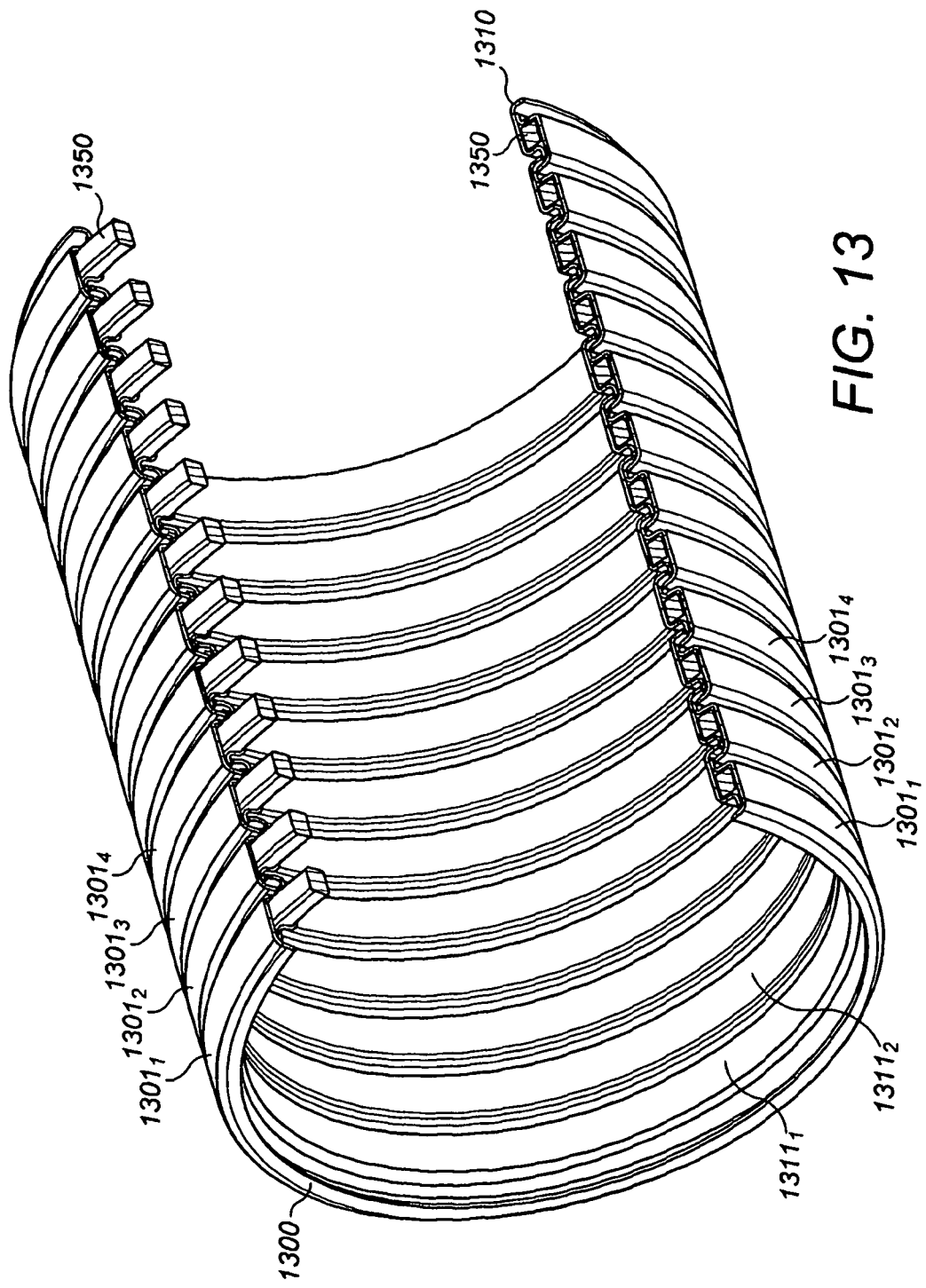
FIG. 13 illustrates the carcass layer of FIG. 12 including filled channel regions.

FIG. 12 illustrates a carcass layer 101 in a length of flexible pipe body in which adjacent windings of a carcass layer tape 1190 interlock together. Each winding thus forms an annular element which extends around an inner circumference of a bore region. As illustrated in FIG. 12 the carcass layer 101 is formed by helically winding the tape 1190 so that adjacent windings are interlocked. A cross section of the carcass tape 1190 is substantially Z-shaped and the body of the tape is wholly or partially hollow. As with the previously described examples the tape body can be a shell encapsulating a single channel or can define more than one channel by having a partially filled body cavity region or plate element separating the central channel. The channel region 1201 is illustrated as being hollow in FIG. 12. Alternatively the channel region can be filled with an insulating aerogel material or other such insulating material. Alternatively as illustrated in FIG. 13 the channel can be filled with a strengthening material 1350. For example, the strengthening element 1350 can be formed of a metal material, such as carbon, stainless steel or the like, whilst the body of the tape 1190 is made from a composite material such as glass fibre, carbon fibre, reinforced plastic or the like.

The wound tape thus forms a layer extending axially along the length of the flexible pipe body. The cross section of the carcass tape 1190 has an imaginary centre line C and has an inwardly turned nose 1300 at a first edge of the tape. The nose 1300 blends into a horizontal region 1301 and the tape is then bent into a substantially linear region 1302 towards the centre line and then away from the centre line. The central region 1302 then turns away from the first edge into a flange region 1303. As illustrated in FIG. 12 the tape 1190 is generated from a first curved wall and a further curved wall. These are tape elements. The tape elements shown have a similar and constant cross section. Aptly the tape elements can have different cross sections, also these may optionally be non-constant. The first curved wall which forms the first nose 1300, horizontal portion 1301, central region 1302 and first flange region 1303 is formed spaced apart from the further curved wall in a middle region thereof. The further curved wall includes an inwardly turned nose 1310 which forms a further edge of the carcass tape. This inwardly turned nose extends into a horizontal region 1311 which then extends in towards the imaginary centre line as a linear region 1312. This linear region then flares out towards the first edge of the tape forming a further flange region 1313. The curved walls are integrally formed or may be separately made and then secured together such as by welding, adhering or the like.

The tape formed by the juxtaposed curved walls may be wound in a helical fashion to form the carcass layer as will be understood by those skilled in the art. The nose of an outer curved wall and flange region of the inner curved wall form a hook region whilst the nose of the inner curved wall and flange region of the first curved wall form a valley region. A hook region of a winding nests within a valley region of an adjacent winding as the carcass layer is manufactured. The channel region 1201 is formed in the parallel spaced apart region between the inner surfaces of the curved walls of the carcass tape. Prior to manufacturing of the flexible pipe body this channel may be filled wholly or partially with a desired material. For example, an aerogel material can be utilised. Alternatively, the channel region is filled with a material having a different mechanical property from the body region formed by the curved walls of the tape. As a result certain materials can be used to form the tape body whilst the same or different materials can be used to wholly or partially fill the channel region which runs along the centre of the carcass tape. This allows a manufacturer of the flexible pipe body to tailor the materials selected according to the purpose for which the flexible pipe is manufactured. Each winding of the carcass tape forms an annular element which thus extends around an inner circumference of a bore region. A channel region is provided within the body portion of the carcass tape.

The channel region can be filled wholly or partially with one or more materials having different characteristics. For example, an aerogel material can be used which provides a high degree of insulation to the carcass layer. Aptly the channel region is substantially filled with a material that dissolves within a predicted period of time. Alternatively the channel can hold a vacuum, an insulating tape containing glass microspheres, a foam or the like.

Figure 14:
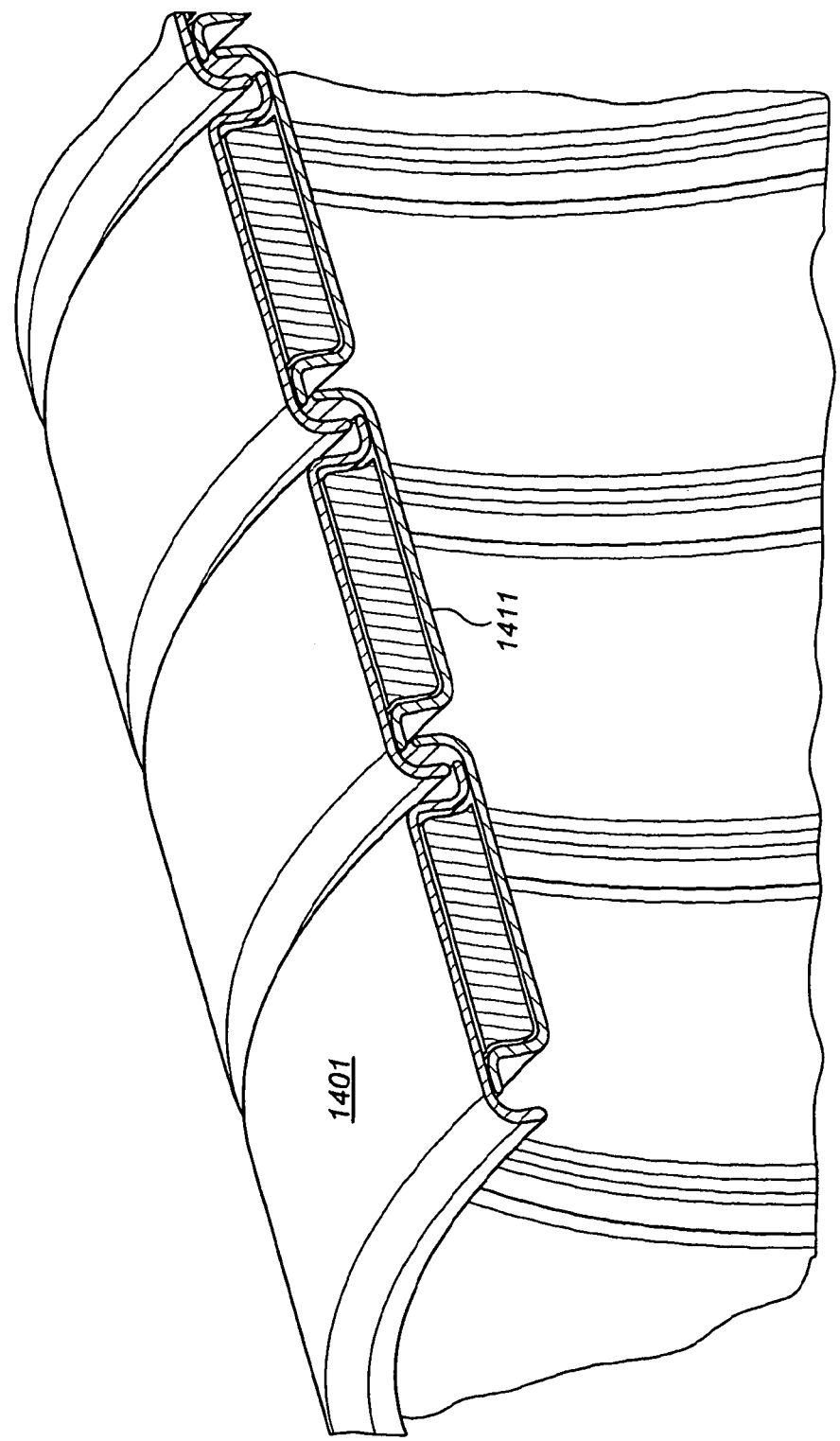
FIG. 14 illustrates an alternative carcass layer.

FIG. 14 illustrates an alternative carcass tape to that illustrated in FIGS. 12 and 13. In many respects this carcass tape is similar to that shown in FIGS. 12 and 13, however, the curved walls of the body of the carcass tape have elongated horizontal portions 1401, 1411 relative to the corresponding portions of the carcass tape shown in FIGS. 12 and 13. This enables the channel region in the carcass tape to have a greater volume per winding and provides a further way in which the physical characteristics of the carcass tape can be modified according to the purpose for which the flexible pipe including the carcass layer is to be used. The width and/or thickness of the tape, material of the tape body and material held in the channel within the tape can be selected as desired according to the performance parameters needed in the flexible pipe body. Aptly the width to thickness ratio of the tape is 2:1 or greater. Aptly the width to thickness ratio is 3:1 or greater.

Figure 15:
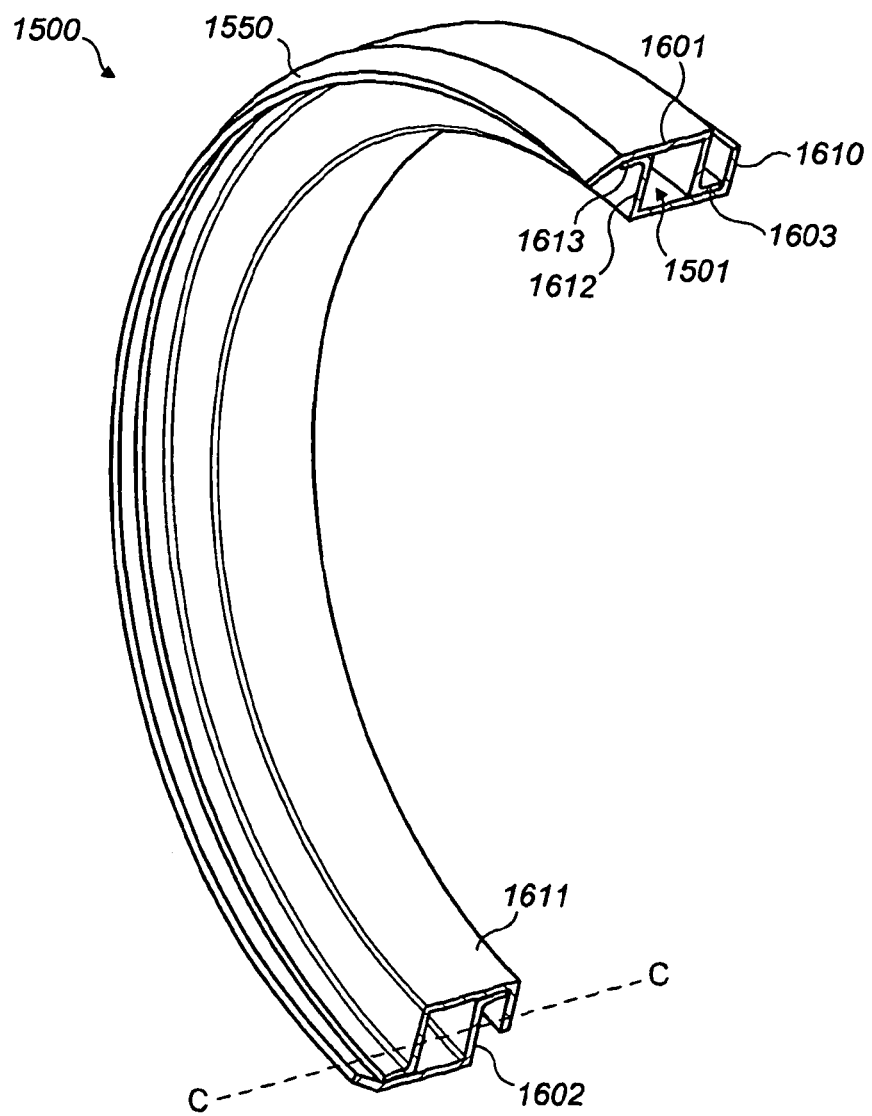
FIG. 15 illustrates a hoop element.

FIG. 15 illustrates a hoop 1500 which includes a hollow channel region 1501 which can be left hollow or which may be filled with an aerogel material or other such insulating material or a strengthening material. Multiple hoops may be aligned next to each other in a side-by-side coaxial relationship. The independent hoops can be interlocked together with adjacent hoops being interlocked together so as to form a carcass layer of a flexible pipe body. The hoop 1500 is an annular element with the carcass layer when formed comprising adjacent interlocked annular elements each made up of a body portion that extends around an inner circumference of a bore region. A channel region 1501 is provided within the body portion of each hoop.

As illustrated in FIG. 15 each hoop element has a circular outer surface. The cross section of the hoop 1500 has an imaginary centre line C and has a partially inwardly turned nose 1550 at a first edge of the hoop. The nose 1550 blends into a horizontal region 1601 with the outer surface of this horizontal region provided the circular outer cross section of the hoop. The horizontal region 1601 is then bent towards the imaginary centre line and then away from the centre line in a substantially linear central region 1602. This central region 1602 is then turned away from the first edge of the hoop into a flange region 1603. As illustrated in FIG. 15 the hoop 1500 is generated from a first curved wall and a further curved wall. These are tape elements. The tape elements shown have a similar and constant cross section. Aptly the tape elements can have different cross sections and may optionally have a non-constant cross section. The first curved wall which forms the first nose 1550, horizontal portion 1601, central region 1602 and first flange region 1603 is formed spaced apart from the further curved wall in a middle region thereof. The further curved wall includes an inwardly turned nose 1610, which forms a further edge to the hoop horizontal portion 16111, which has an inner surface forming the inner surface of the hoop. The horizontal region 1611 of the further curved wall bends first towards the imaginary centre line and then continues away from the centre line in a further linear central region 1612 before being bent towards the first edge of the hoop in a further flange region 1613.

Figure 16:
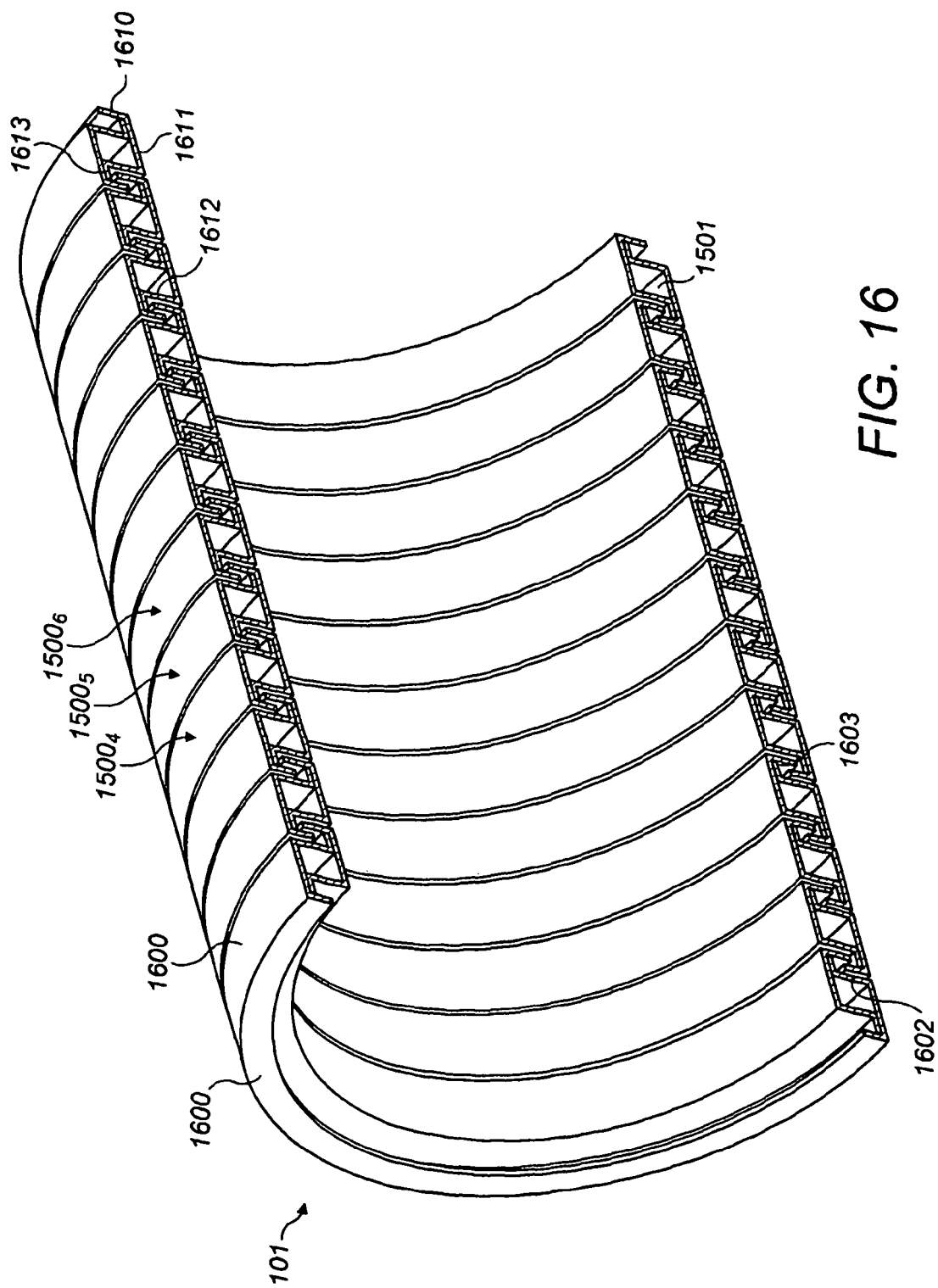
FIG. 16 illustrates interlocked hoop elements.

Unlike the generation of a carcass layer by helically winding a tape the carcass layer of flexible pipe body manufactured with multiple hoop elements of the type shown in FIG. 15 is manufactured by locating hoop elements side-by-side, one-by-one, and bending the nose 1550 at the first edge of the hoop over the upstanding nose 1619 of a preceding hoop. FIG. 16 illustrates the nose 1600 bent inwardly from the partially inclined position 1550 illustrated in FIG. 15.

The nose of an outer curved wall and flange region of an inner curved wall form a hook region whilst the nose of the inner curved wall and flange region of the first curved wall form a valley region. A hook region of a hoop nests within a valley region of an adjacent hoop as the carcass layer is manufactured. The channel region 1501 is formed in the parallel spaced apart region between the juxtaposed curved walls of the carcass hoop. Prior to manufacturing of the flexible pipe body this channel may be filled wholly or partially with a desired material. For example, an aerogel material can be utilised. Alternatively, the channel region is filled with a material having a different mechanical property from the body region formed by the curved walls of the hoop. As a result certain materials can be used to form the hoop body whilst the same or different materials can optionally be used to wholly or partially fill the channel region which runs along the centre of the hoop. This allows a manufacturer of the flexible pipe body to tailor the material selected according to the purpose for which the flexible pipe is manufactured. Each independent hoop in the carcass layer forms an annular element which thus extends around an inner circumference of a bore region. A channel region is provided within the body portion of the carcass hoop.

An advantage of generating a carcass layer using independent hoop elements which are interlocked together with adjacent hoop elements in a side-by-side coaxial relationship, is that the hoop elements may each be manufactured from different materials. Therefore a profile may be generated along the length of flexible pipe body having zones with certain physical characteristics at one region (provided by hoops manufactured from the same or similar materials) and one or more further zones along the length of the flexible pipe body at desired locations where the hoop elements used to manufacture the flexible pipe body in those zones are manufactured from materials different from the materials used for the hoop elements in the first zone.

Figure 17:
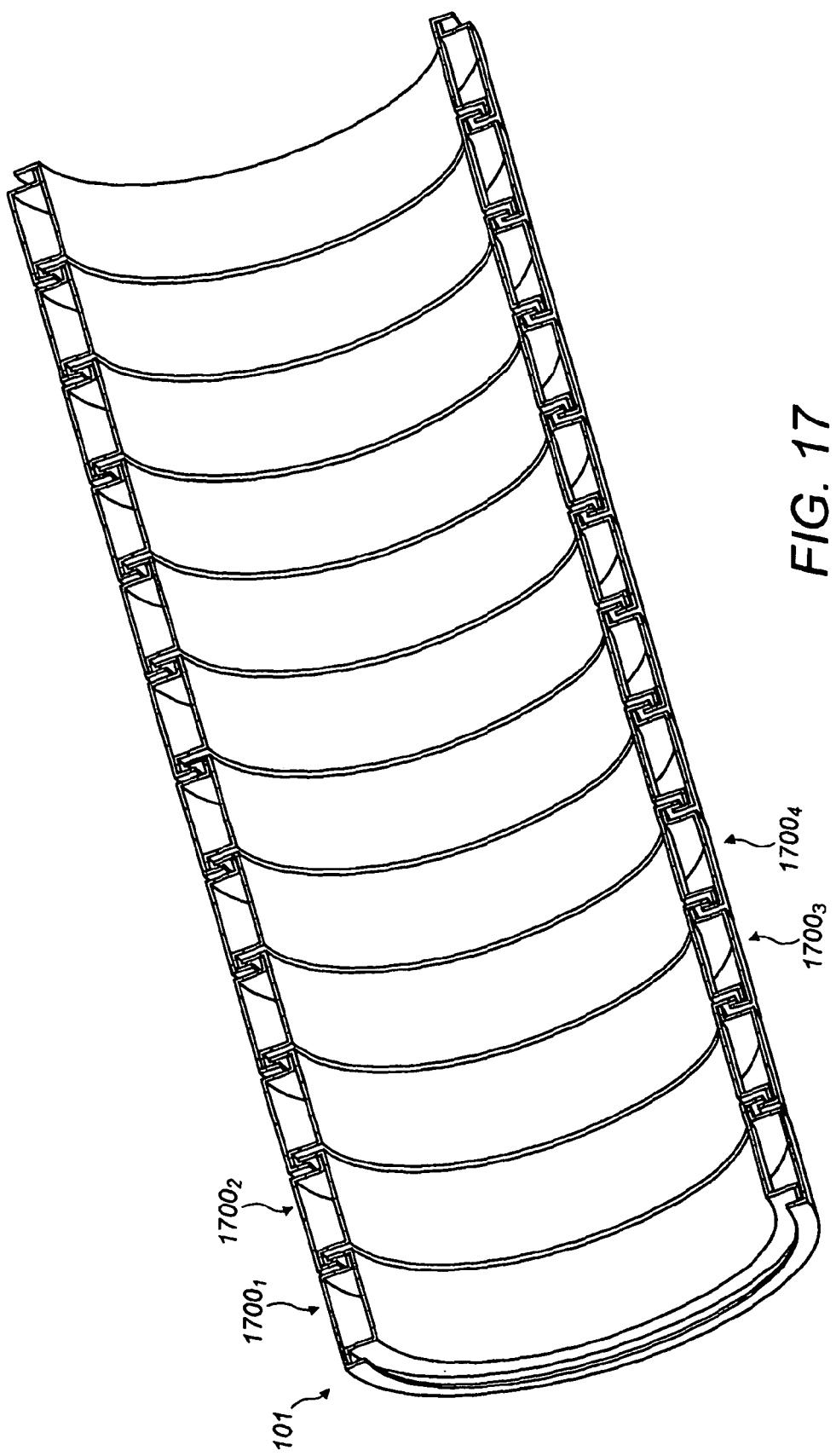
FIG. 17 illustrates alternative hoop elements interlocked.

FIG. 17 illustrates how a carcass layer may be manufactured from interlocking independent hoops having a different cross sectional profile from the hoops illustrated in FIGS. 15 and 16. In many respects the cross section of the hoop elements shown in FIG. 17 are similar to those shown in FIGS. 15 and 16. However, the horizontal portions of the first curved wall and further curved wall are stretched relative to the corresponding portions shown in FIGS. 15 and 16. This enables a different width to thickness ratio of the hoops to be utilised. Aptly the width to thickness ratio of the hoop is 2:1 or greater. Aptly the width to thickness ratio is 3:1 or greater. The variation of the width to thickness ratio enables the volume of the channel region to be selected according to environmental factors which the flexible pipe body will experience in use.

An advantage of using the hoops shown in FIGS. 15, 16 and 17 to manufacture a carcass layer is that each hoop element can be independently manufactured prior to manufacture of the flexible pipe body. These may then be stored until the moment in time when flexible pipe body is to be manufactured. The materials used to manufacture each hoop element can be selected according to a physical performance required of the hoop. The hoops can be integrally formed or can be made from two or more separate walls secured together. These curved walls can be manufactured from the same or different materials. Each hoop is thus preformed prior to manufacture of a carcass layer and a channel formed within the body of the hoop can be left empty or may be filled with a desired material. If a carcass layer having a high degree of thermal insulation is required an aerogel material or some other insulating material may be loaded into the channel. It will be appreciated that during manufacture of the hoop the channel region within the hoop can optionally first be evacuated to help reduce thermal conductivity across the hoop. Also the use of rigid material (such as metal or composite materials or the like) to manufacture the hoop body means that low density aerogels may optionally be used.

Alternatively the channel region in each hoop can be at least partially filled with a material which will increase the strength of the hoop. That is to say will increase the ability of the hoop to resist crushing forces. The channel region can of course be filled with any material that provides a desired physical characteristic to the finished carcass layer.

Figure 18:
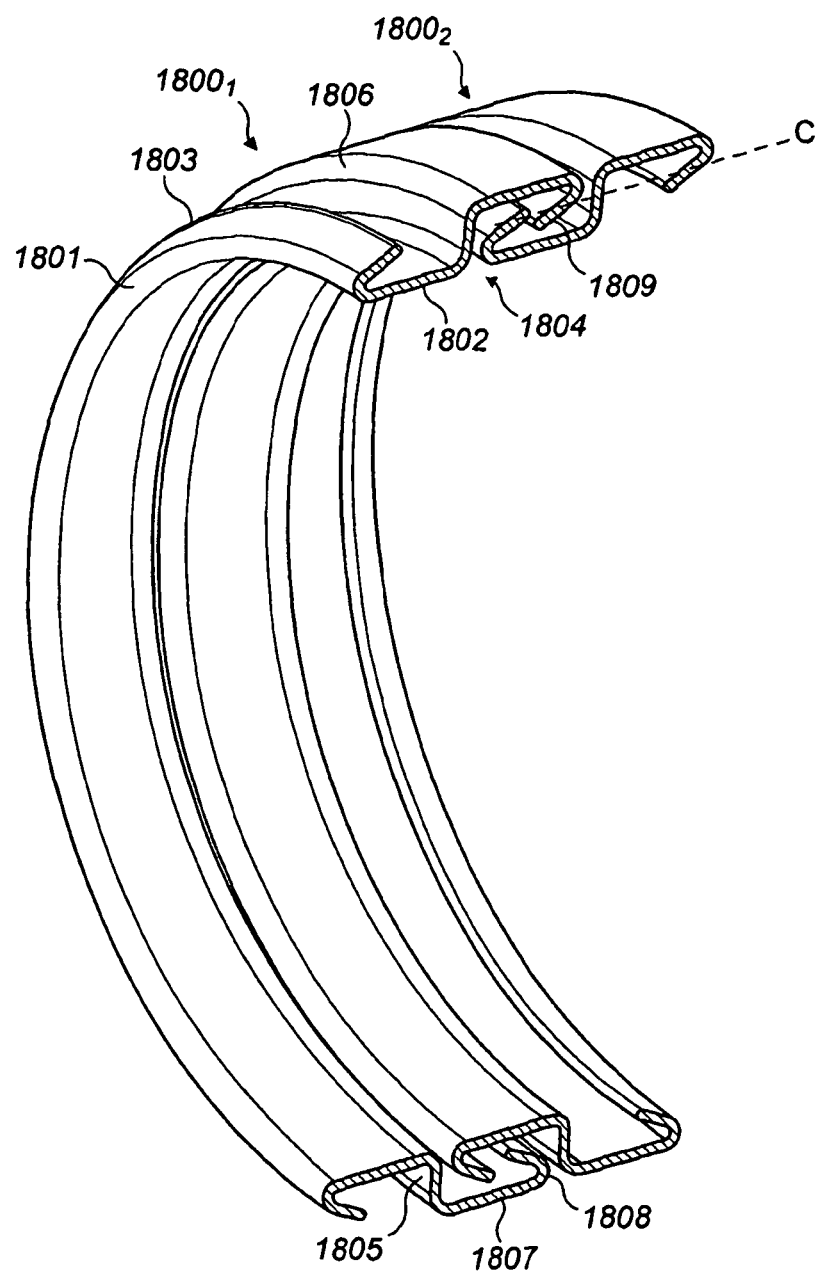
FIG. 18 illustrates alternative interlocked hoop elements.

FIG. 18 illustrates how hoops 1800 which do not have a channel region can be utilised to provide a carcass layer for flexible pipe body. As illustrated in FIG. 18 a hoop has a substantially S-shape. Each hoop element 1800 has an imaginary centre line C and a first edge 1801 of a hoop is formed by a horizontal portion 1802 of the hoop element being bent back partially on itself to form a nose 1803. The horizontal section 1802 is then bent towards the centre line C at a first bend 1804 into a central substantially linear region 1805 which then continues away from the centre line until being bent at a further bend region 1806 into a further horizontal region 1807. This further horizontal region 1807 is substantially parallel to the first horizontal portion 1802 in the cross section of the hoop 1800. The further horizontal portion is then bent back upon itself to form a further edge 1808 of the hoop which extends into an inwardly turned nose 1809.

As illustrated in FIG. 18 multiple hoop elements $1800_1$, $1800_2$ ... $1800_n$ can be aligned in a side-by-side coaxial relationship and interlocked so as to form a carcass layer in flexible pipe body. The inwardly turned nose 1803 at a first edge of a hoop interlocks with an inwardly turned nose 1809 in an adjacent hoop to ensure that hoop elements do not become separated during use.

Figure 19:
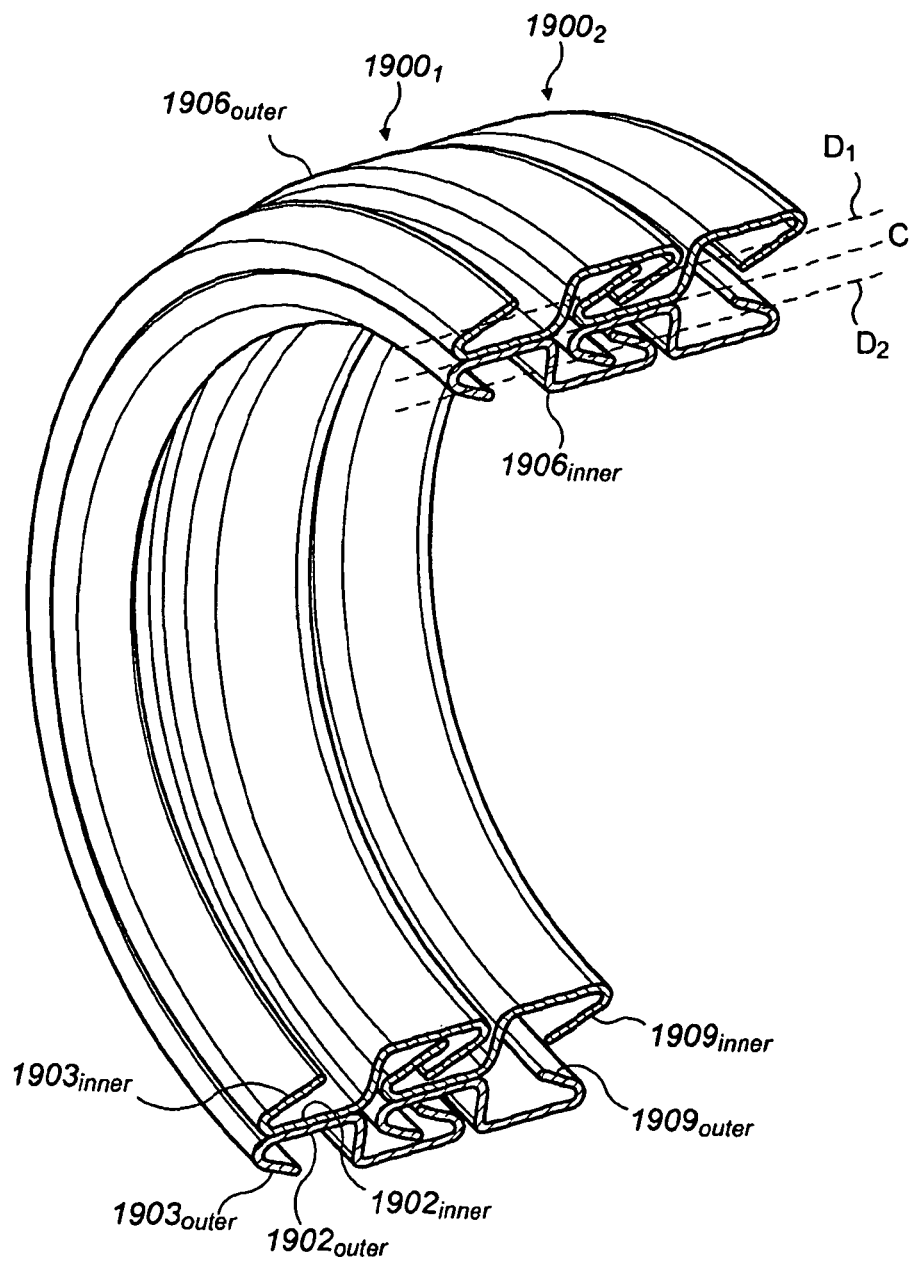
FIG. 19 illustrates interlocked hoop elements.

FIG. 19 illustrates how a carcass layer can be manufactured from interlocked hoops 1900. Each hoop shown in FIG. 19 is formed from a first curved wall of the type illustrated in FIG. 18 and a juxtaposed mirror image of that curved wall formed as a second curved wall secured or integrally formed with the first curved wall. Each hoop 1900 has an imaginary centre line C and an outer part imaginary centre line $D_1$ and an inner part imaginary centre line $D_2$. A first edge 1901 of a hoop comprises twin rings formed by an inner and outer horizontal portion 1902 being bent backward to form respective inner and outer noses 1903. Each of the inner and outer horizontal sections 1902 is then bent away from the main centre line C towards a respective imaginary inner or outer centre line $D_1$, $D_2$. From a respective central substantially linear region 1905 a further bend region 1906 is formed which turns each curved side wall into a respective horizontal region 1907$_{inner}$, 1907$_{outer}$. This further horizontal region 1907 is substantially parallel to the first horizontal portion 1902. The further horizontal portion is then bent back upon itself at a further edge 1908 which is formed as two distinct rings. The bent back horizontal portion forms an inner and outer inwardly turned nose 1909. As will be appreciated by those skilled in the art a carcass layer may be manufactured by interconnecting hoops one by one or many simultaneously by pushing the edges of the hoops together so that the nose regions at a first edge of a hoop interlock with the nose regions of an adjacent hoop. The hoops may be manufactured from the same or different materials. The curved walls of each hoop may be integrally formed or may be secured together by welding, gluing, riveting or the like.

Figure 20:
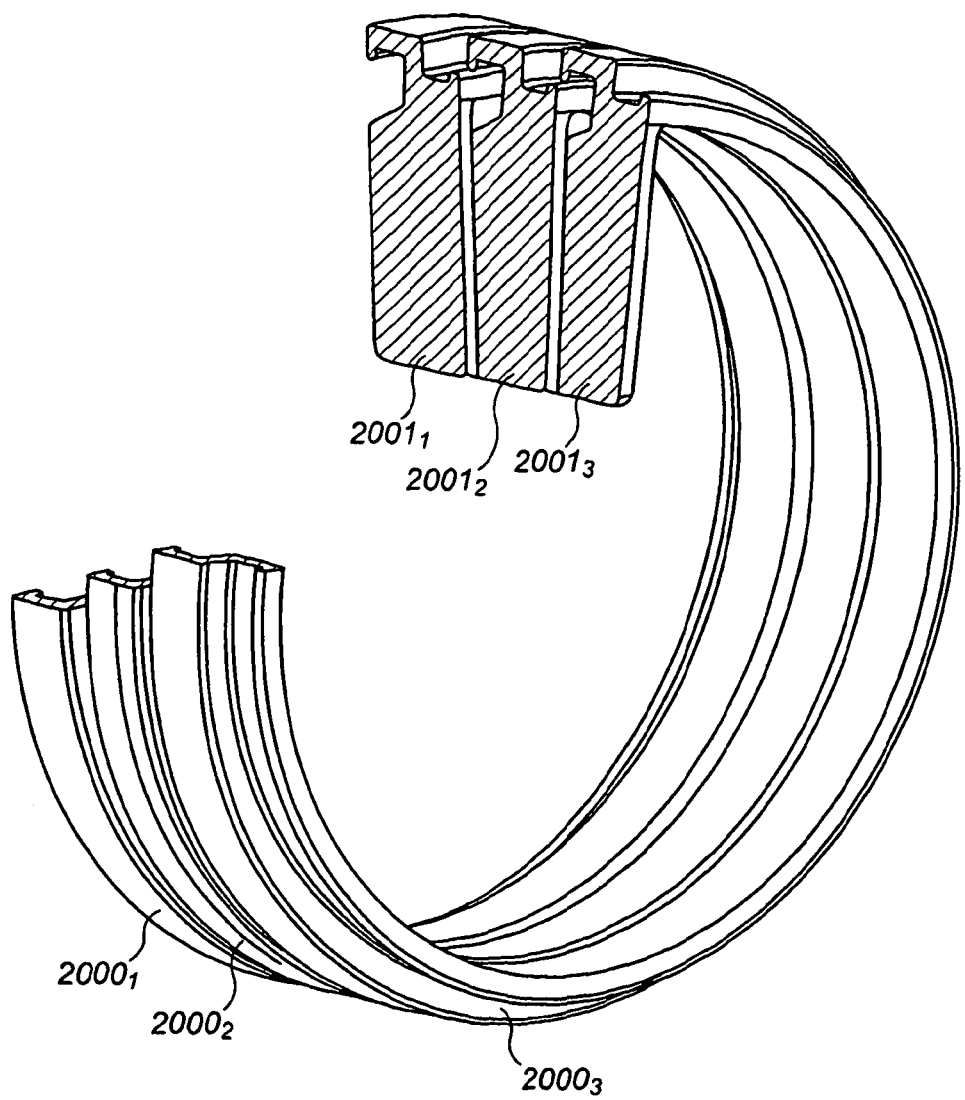
FIG. 20 illustrates hoops with fins.

FIG. 20 illustrates how hoops having a solid cross section (that is to say without an internal channel) may be connected together to form a carcass layer. These hoops each have a respective fin 2001 which is a plate extending from an inner surface of the hoop. The hoops may be aligned and interconnected during a manufacturing process so that the fins are exactly aligned in a linear array axially along the length of the flexible pipe body. Alternatively, each fin or the fins of a group of hoops may be radially offset with respect to fins in an adjacent hoop or adjacent group. As a result it will be appreciated that the rotational offset between the fins can induce a rotation motion in fluid transported along the bore of the flexible pipe body. This can be advantageous in certain environments and/or when certain types of transport fluid are being transported. Fins can of course be used with hoops previously described which include an internal channel.

Figure 21:
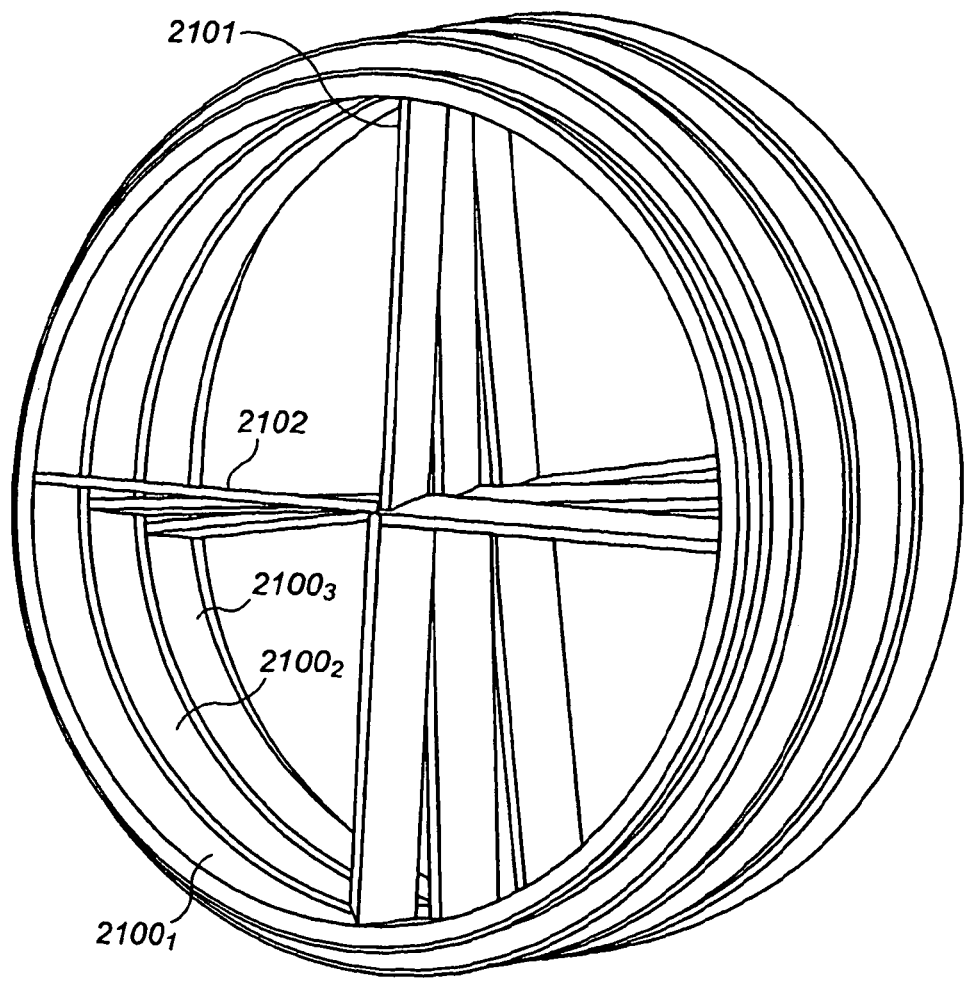
FIG. 21 illustrates hoops with strengthening beams.

FIG. 21 illustrates how multiple hoops may be interlocked together to form a carcass layer of flexible pipe body. As illustrated in FIG. 21 the hoops include cross beams 2101 which extend across a diameter of the hoops. Further cross beams 2102 also extend across the diameter of the hoops at right angles to the first cross beams. It will be appreciated that each cross beam acts as a strengthening element so as to increase the crush resistance of each hoop element. One, two or more cross beams may be utilised per hoop. The cross beams of hoops interlocked together to form a carcass layer may be aligned or may be rotationally offset with respect to one another. Alternatively the cross beams of groups of hoops may be aligned or may be rotationally offset with the cross beams in other groups of hoop elements. The offsetting of cross beams can be used to induce a rotational motion ing fluid transported in the bore region. Alternatively/additionally the offsetting of cross beams can provide a flexible pipe body which is resistant to crushing forces at different radial angles.

The cross beams can of course alternatively extend across only part of the hoop rather than extending across diametrically.

Hoops can be made which have a circular outer shape but are filled in so that an internal bore of the flexible pipe body has a non-circular cross section.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body for transporting fluids from a sub-sea location, comprising:
    a carcass layer comprising a plurality of independent hoop elements each comprising a body portion forming a complete and closed hoop having a circular outer surface that circles around an inner circumference of a bore region of the flexible pipe, said body portion being arranged to interlock adjacent hoop elements together, wherein the carcass layer is the innermost layer of the flexible pipe body,
    wherein the body portion further comprises a male connection region comprising a hook region and a female connection region comprising a valley region disposed on either side of a central region, a male connection region of a first hoop element being locatable in the female region of an adjacent hoop element to thereby interlock adjacent hoop elements,
    wherein the hook region comprises a nose region that extends radially inwardly towards an imaginary centre line running across a cross section of the body portion and the valley region comprises a nose region that extends radially outwardly towards the centre line;
    wherein respective ends of the nose regions extend past each other in the radial direction such that the nose regions can abut each other and interlock adjacent hoop elements in the axial direction.

2. The flexible pipe body as claimed in claim 1, further comprising:
the adjacent hoop elements are disposed in a side-by-side co-axial relationship along the bore region.

3. The flexible pipe body as claimed in claim 1, further comprising:
each hoop element has an inner surface comprising at least one fin element, fin elements of adjacent hoop elements in a plurality of hoop elements of the carcass layer being rotationally offset from one another to thereby provide a rotation motion in fluid transported in the bore region.

4. The flexible pipe body as claimed in claim 1, further comprising:
each hoop element has an inner surface comprising at least one cross beam element for strengthening a crush characteristic of the hoop element.

5. The flexible pipe body as claimed in claim 1, further comprising:
the central region comprises a housing encasing an annular channel region.

6. The flexible pipe body as claimed in claim 1, further comprising:
the body portion is a substantially Z-shaped housing.

7. The flexible pipe body as claimed in claim 6, further comprising:
the carcass layer further comprises a plurality of connecting rings having a substantially H-shaped cross section, a respective connecting ring being located between an inwardly turned nose region and an outwardly turned nose region of adjacent hoop elements.

8. The flexible pipe body as claimed in claim 7, further comprising:
an inwardly turned nose region of a first hoop element rides within a substantially U-shaped channel defined by a radially outwardly facing surface of the H-shaped connecting ring and an outwardly turned nose region of an adjacent hoop element rides in a substantially inverted u-shaped channel defined by a radially inwardly surface of the H-shaped connecting ring.

9. The flexible pipe body as claimed in claim 1, further comprising:
the body portion comprises a first plate element and a further plate element, the first plate element and further plate element being disposed in a spaced apart substantially parallel relationship at a centre region of each hoop element and secured together at either side of the centre region to thereby define an annular channel region between the plate elements.

10. The flexible pipe body as claimed in claim 9, further comprising:
a cross section of each plate element has a substantially constant thickness.

11. The flexible pipe body as claimed in claim 9, further comprising:
the first and further plate elements are secured together at a first side of the channel region via an edge region of the further plate element and an intermediate region of the first plate element, said intermediate region extending to a hooked region of the first plate element.

12. The flexible pipe body as claimed in claim 11, further comprising:
the first and further plate elements are secured together at a second side of the channel region via an edge region of the first plate element and an intermediate region of the further plate element, said intermediate region of the further plate element extending to a hooked region of the further plate element.

13. The flexible pipe body as claimed in claim 12, further comprising:
the hooked region of the first plate element and the further plate element are turned towards the imaginary centre line whereby the hooked region of the first plate element of a first winding interlocks with a valley region formed by an outwardly turned hooked region of the further plate element in an adjacent winding.

14. The flexible pipe body as claimed in claim 13, further comprising:
a width to thickness ratio of the hoop element is more than 2:1.

15. The flexible pipe body as claimed in claim 1, further comprising:
the body portion of each hoop element in the carcass layer is formed from an identical material.

16. The flexible pipe body as claimed in claim 1, further comprising:
the body portion of a first plurality of hoop elements in the carcass layer is formed from a first material different from a material used to form a further plurality of hoop elements in the carcass layer.

17. The flexible pipe body as claimed in claim 1, further comprising:
a channel region of a first plurality of hoop elements in the carcass layer is filled with a first material and a channel region of a further plurality of hoop elements in the carcass layer is filled with a further material different from said first material.

18. A flexible pipe for transporting fluids from a sub-sea location, comprising:
the flexible pipe body as claimed in claim 1; and
one or more end fitting.

19. A jumper, riser or flow line comprising the flexible pipe as claimed in claim 18.

20. A method of manufacturing flexible pipe body for transporting fluids from a subsea location, comprising the steps of:
forming individual, separate independent hoop elements each comprising a complete and closed hoop;
after the act of forming, locating the independent hoop elements in a side-by-side coaxial relationship; and
interlocking adjacent hoop elements together thereby nesting a hook region of a first hoop element in a valley region of an adjacent element thereby forming a carcass layer, which is the innermost layer of the flexible pipe body,
wherein the hook region comprises a nose that extends radially inwardly and the valley region comprises a nose that extends radially outwardly; wherein respective ends of the noses extend past each other in the radial direction such that the noses can abut each other and interlock adjacent hoop elements in the axial direction.

21. The method as claimed in claim 20, further comprising the steps of:
interlocking hoop elements by urging adjacent hoop elements together to connect respective press fit elements on each hoop element to interconnect.

22. The method as claimed in claim 20, further comprising the steps of:
interlocking hoop elements one by one or interlocking a plurality of hoop elements substantially simultaneously.

23. The method as claimed in claim 20, further comprising the steps of:
interlocking hoop elements by locating a first hoop element adjacent to, and in side-by-side configuration with, a further hoop element; and bending an interconnection element of one of the first or further hoop elements over a portion of a remainder one of the first or further hoop elements.

24. The method as claimed in claim 20, further comprising the steps of:
interlocking a plurality of hoop elements manufactured from a first material together at a desired location of the carcass layer and interlocking a plurality of hoop elements manufactured from a further material together at a further desired location in the carcass layer.

25. A closed hoop element for forming flexible pipe body, comprising:
a closed annular body portion comprising a hook region and a valley region on a first and further respective side of the body portion, wherein the hook region comprises a nose that extends radially inwardly and the valley region comprises a nose that extends radially outwardly;
wherein an imaginary line axially extending through the body portion parallel to a central axis of the hoop element intersects the nose of the hook region and the nose of the valley region.

26. The hoop element as claimed in claim 25, further comprising:
an annular channel region extending around the closed hoop element.

27. The hoop element as claimed in claim 26, wherein the channel region is filled with an insulating material and/or strengthening material.

28. The hoop element as claimed in claim 25, further comprising:
a fin element extending from an inner surface of the body portion.

29. The hoop element as claimed in claim 25, further comprising:
a cross beam element extending across an inner surface of the body portion.

* * * * *